(12) United States Patent
Hoppe et al.

(10) Patent No.: US 11,027,399 B2
(45) Date of Patent: Jun. 8, 2021

(54) HAND TOOL SUCH AS A WIRE STRIPPER OR COMBINATION PLIERS

(71) Applicant: Milwaukee Electric Tool Corporation, Brookfield, WI (US)

(72) Inventors: Christopher S. Hoppe, Milwaukee, WI (US); Mark W. Cors, St. Francis, WI (US); Steven W. Hyma, Milwaukee, WI (US); Grant T. Squiers, Cudahy, WI (US); Michael Stearns, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 649 days.

(21) Appl. No.: 15/089,025

(22) Filed: Apr. 1, 2016

(65) Prior Publication Data

US 2016/0294168 A1   Oct. 6, 2016

Related U.S. Application Data

(60) Provisional application No. 62/175,870, filed on Jun. 15, 2015, provisional application No. 62/142,298, filed on Apr. 2, 2015.

(51) Int. Cl.
*H02G 1/12* (2006.01)
*B25B 7/14* (2006.01)
(Continued)

(52) U.S. Cl.
CPC .............. *B25B 7/22* (2013.01); *B25B 7/02* (2013.01); *B25B 7/14* (2013.01); *B25F 1/003* (2013.01); *H02G 1/1214* (2013.01)

(58) Field of Classification Search
None
See application file for complete search history.

(56) References Cited

U.S. PATENT DOCUMENTS 871,585 A  *  11/1907  Haeberli ................... B25B 7/02
                                                           7/131
1,963,144 A      6/1934  O'Russa
(Continued)

FOREIGN PATENT DOCUMENTS

CA        594408        3/1960
CA        601676        7/1960
(Continued)

*Primary Examiner* — Brian D Keller
(74) *Attorney, Agent, or Firm* — Reinhart Boerner Van Deuren s.c.

(57) ABSTRACT

A hand tool and a wire stripper. The hand tool may include a first jaw portion and a second jaw portion having a spring constant more than about 2,225 lbs./in., measured when a force is applied in a direction parallel to the pivot axis to an associated jaw tip with a pivot member being held. The hand tool may include a jaw portion having a gripping surface and an angled wall connected to a side wall and defining a wire stripping portion, the wire stripping portion including a cutting edge and a recess defined in the angled wall, the recess extending from the cutting edge to an end at the one of the side walls, the angled wall being arranged non-parallel to the gripping surface and non-perpendicular to the side wall. The wire stripper may be a forged wire stripper including jaws defining a stripping aperture for Romex® NM wire.

10 Claims, 31 Drawing Sheets

(51) Int. Cl.
  *B25B 7/22* (2006.01)
  *B25B 7/02* (2006.01)
  *B25F 1/00* (2006.01)

(56) References Cited

U.S. PATENT DOCUMENTS

| | | | |
|---|---|---|---|
| 1,966,593 | A | 7/1934 | O'Russa |
| 2,423,805 | A | 7/1947 | Wendt |
| 2,544,197 | A | 3/1951 | Vosbikian et al. |
| 2,690,010 | A | 9/1954 | Keller |
| 2,746,145 | A | 5/1956 | Klein, Jr. et al. |
| 2,848,724 | A | 8/1958 | Wendt |
| 2,848,810 | A | 8/1958 | Wendt |
| 2,903,790 | A | 9/1959 | Klein, Jr. |
| 2,938,266 | A | 5/1960 | Klein, Jr. |
| 3,834,026 | A | 9/1974 | Klein |
| 3,947,905 | A * | 4/1976 | Neff ............ B25B 7/22 7/107 |
| 4,621,401 | A | 11/1986 | Anderson |
| 4,625,379 | A | 12/1986 | Anderson |
| 4,872,551 | A | 10/1989 | Theros |
| 5,050,465 | A | 9/1991 | Haugs |
| 5,179,783 | A | 1/1993 | Melter |
| 5,341,707 | A | 8/1994 | Bond |
| 5,377,412 | A | 1/1995 | Schofield et al. |
| 5,421,224 | A | 6/1995 | Bond |
| 5,535,519 | A * | 7/1996 | Brimmer ........ H02G 1/1214 30/90.1 |
| 5,934,342 | A * | 8/1999 | Danielson ........ B21F 9/02 140/121 |
| 6,202,517 | B1 | 3/2001 | Dolan |
| 6,301,787 | B2 | 10/2001 | Mock |
| 6,446,344 | B1 | 9/2002 | Gontar |
| 6,473,925 | B1 * | 11/2002 | Konen ............ B25B 7/02 7/107 |
| 6,574,870 | B1 | 6/2003 | Huang |
| 6,684,439 | B2 | 2/2004 | Jeske et al. |
| 7,353,736 | B2 | 4/2008 | Poehlmann |
| 7,404,822 | B2 | 7/2008 | Viart et al. |
| 7,669,505 | B2 | 3/2010 | Campbell et al. |
| 7,861,622 | B2 | 1/2011 | Chervenak et al. |
| 7,921,752 | B2 | 4/2011 | Poehlmann |
| 8,056,451 | B2 | 11/2011 | Chervenak et al. |
| 8,316,549 | B2 | 11/2012 | Musser |
| D688,927 | S | 9/2013 | Wong |
| 8,667,874 | B2 | 3/2014 | Steele et al. |
| 8,713,805 | B2 | 5/2014 | Schneider et al. |
| 2003/0041702 | A1 | 3/2003 | Kang |
| 2005/0044715 | A1 | 3/2005 | Shutts et al. |
| 2007/0144015 | A1 | 6/2007 | Peterson et al. |
| 2008/0022533 | A1 | 1/2008 | Zeller et al. |
| 2010/0000140 | A1 | 1/2010 | Nien |
| 2012/0102752 | A1 | 5/2012 | Steele et al. |
| 2013/0097786 | A1 | 4/2013 | Hardinge et al. |
| 2014/0060264 | A1 | 3/2014 | Steele et al. |
| 2017/0001319 | A1 * | 1/2017 | Wang ............ A01G 3/02 |

FOREIGN PATENT DOCUMENTS

| | | |
|---|---|---|
| CA | 637281 | 2/1962 |
| CA | 532760 | 11/1986 |
| CN | 204149050 | 2/2015 |
| WO | 2009063014 | 5/2009 |
| WO | 2010086170 | 2/2010 |

* cited by examiner

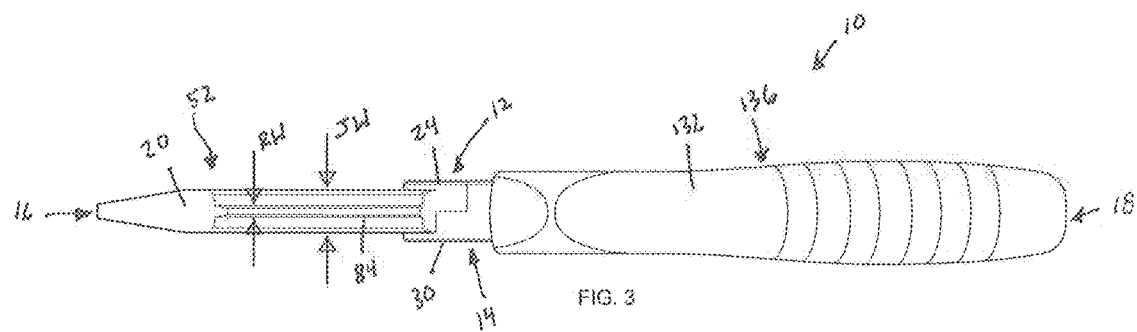
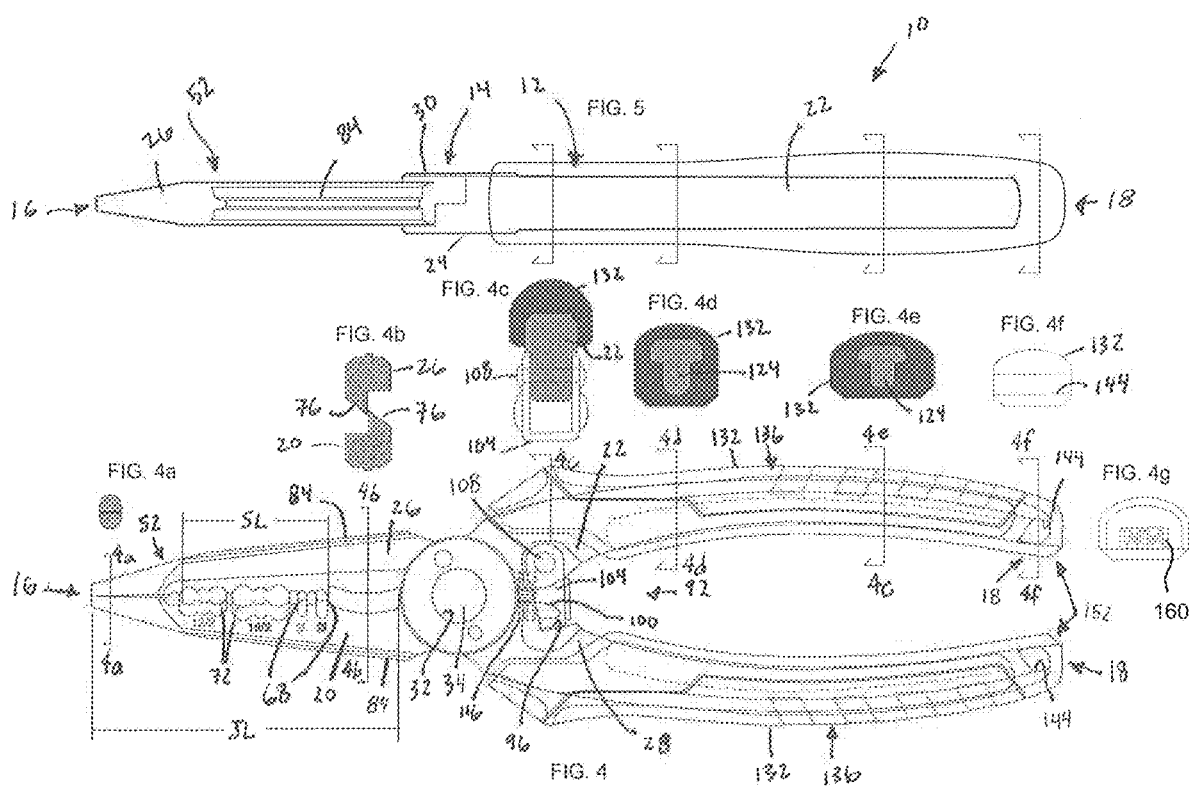

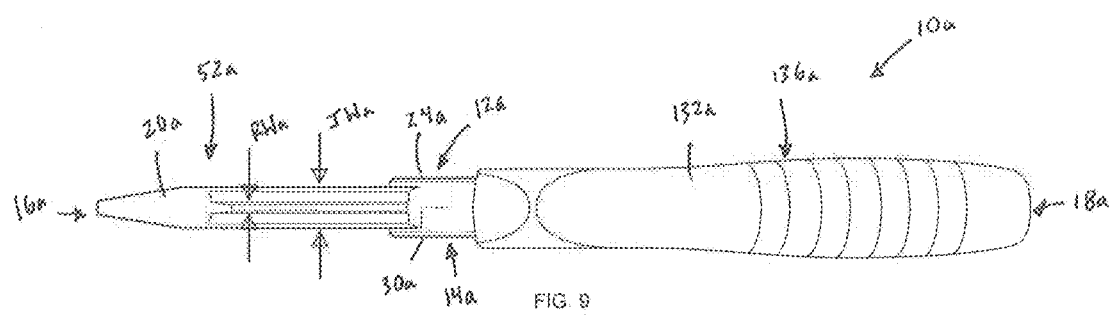

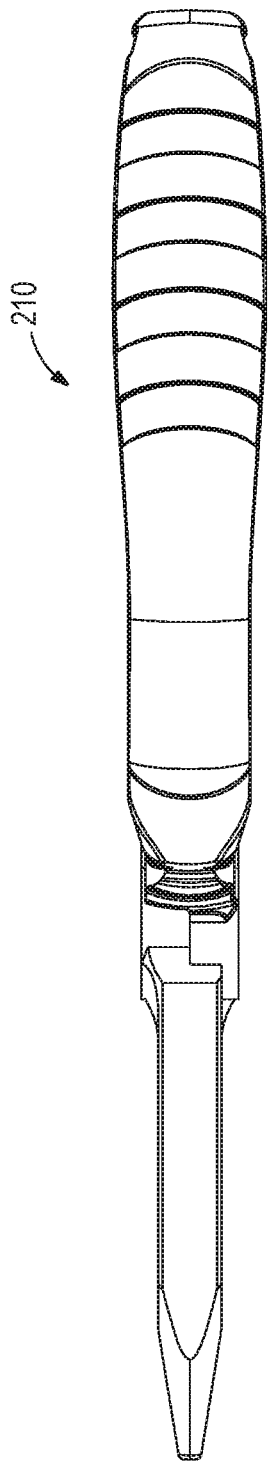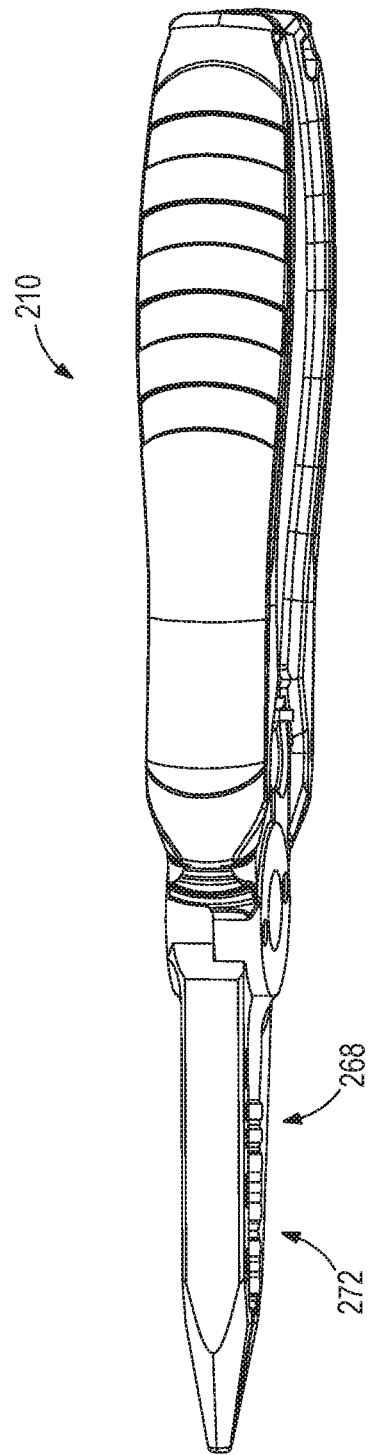
FIG. 18A
FIG. 18B

HAND TOOL SUCH AS A WIRE STRIPPER OR COMBINATION PLIERS

RELATED APPLICATIONS

The present application claims priority to U.S. Provisional Patent Application No. 62/142,298, filed Apr. 2, 2015, and to U.S. Provisional Patent Application No. 62/175,870, filed Jun. 15, 2015, the entire contents of both of which are hereby incorporated by reference.

FIELD

The present invention relates to hand tools and, in particular, to a wire stripper, combination pliers, etc.

SUMMARY

In one independent embodiment, a hand tool, such as a wire stripper, pliers, etc., may generally include jaws pivotable between open and closed positions, a locking member pivotable between a locking position and an unlocking position, and a ramp engageable by the locking member to cause the locking member to pivot away from the locking position. The locking member may include a U-shaped, saddle locking member.

In another independent embodiment, a hand tool, such as a wire stripper, pliers, etc., may generally include at least one jaw having a lateral surface and a rib projecting from and extending longitudinally along the lateral surface, the rib having a reaming edge engageable with a surface of a pipe.

In yet another independent embodiment, a hand tool, such as a wire stripper, pliers, etc., may generally include jaws pivotable between open and closed positions, handles connected to the respective jaws and engageable to pivot the jaws from the open position toward the closed position, each handle having a T-shaped cross-section.

In a further independent embodiment, a set of hand tools may include a wire stripper and pliers. Each hand tool may include a handle having an end with a tactile indicator, the tactile indicator for the wire stripper being different than the tactile indicator of the pliers. One tactile indicator may include a recess formed in a surface of the handle.

In another independent embodiment, a hand tool, such as a wire stripper, pliers, etc., may generally include handle having a grip surface and defining a periphery, a lanyard opening being defined through a portion of the handle within the periphery of the handle.

In yet another independent embodiment, a forged wire stripper may generally include jaws defining a stripping aperture for Romex® NM wire.

In a further independent embodiment, a hand tool, such as a wire stripper, pliers, etc., may generally include jaws pivotable between open and closed positions about a pivot member, each individual jaw having a spring constant of about 2900 pounds per inch (lbs./in.) to about 3000 lbs./in. when a force is applied in a direction parallel to a pivot axis to the tip of the jaw with the pivot pin being held. In some constructions, the spring constant of each jaw may be more than about 2225 lbs./in. or more than about 2250 lbs./in. In still other constructions, the spring constant of each jaw may be more than about 2500 lbs./in., more than about 2750 lbs./in, more than about 2900 lbs./in. or more than about 3000 lbs./in. In some constructions, the spring constant of each jaw may be between about 2300 lbs./in. and about 3200 lbs./in. or between about 2500 lbs./in. and about 3100 lbs./in.

In another independent embodiment, a hand tool, such as a wire stripper, pliers, etc., may generally include jaws pivotable between open and closed positions about a pivot axis, each jaw having a ridged gripping surface in a plane parallel to pivot axis, side walls in a plane perpendicular to pivot axis and to the gripping surface, and an outer wall connecting the side walls, each jaw having an angled wall defining a wire stripping portion and arranged at a non-parallel angle relative to the gripping surface and non-perpendicular to the side wall, stripping apertures of the stripping portion extending along the angled wall from cutting edges to the side wall, the end of each stripping aperture and/or an associated indicator being more easily visible (e.g., at the minimum viewing angle).

In yet another independent embodiment, a hand tool, such as a wire stripper, pliers, etc., may generally include jaws pivotable between open and closed positions, handles connected to the respective jaws and engageable to pivot the jaws from the open position toward the closed position, and a locking member pivotable between a locking position and an unlocking position, the locking member may include a cam engageable with a handle to limit movement of the locking member in the direction of the open position.

Other independent aspects of the invention may become apparent by consideration of the detailed description and accompanying drawings.

BRIEF DESCRIPTION OF THE DRAWINGS

The application file contains at least one drawing executed in color.

FIG. 3 is a bottom view of the wire stripper of FIG. 1.

FIG. 4 is a side view of the wire stripper of FIG. 1.

FIG. 4a is a cross-sectional view of a tip of a nose of the wire stripper of FIG. 1 taken generally along line 4a-4a in FIG. 4.

FIG. 4b is a cross-sectional view of a cutter of the wire stripper of FIG. 1 taken generally along line 4b-4b in FIG. 4.

FIG. 4c is a cross-sectional view of a locking assembly of the wire stripper of FIG. 1 taken generally along line 4c-4c in FIG. 4.

FIG. 4d is a cross-sectional view of a handle portion of the wire stripper of FIG. 1 taken generally along line 4d-4d in FIG. 4.

FIG. 4e is a cross-sectional view of a handle portion of the wire stripper of FIG. 1 taken generally along line 4e-4e in FIG. 4.

FIG. 4f is a cross-sectional view of a lanyard opening of the wire stripper of FIG. 1 taken generally along line 4f-4f in FIG. 4.

FIG. 4g is a planar view of the end of the handle portion of the wire stripper of FIG. 1.

FIG. 5 is a top view of the wire stripper of FIG. 1.

FIG. 8 is a partially exploded view of the pliers of FIG. 7.

FIG. 9 is a bottom view of the pliers of FIG. 7.

FIG. 10 is a side view of the pliers of FIG. 7.

FIG. 10a is a cross-sectional view of a tip of a nose of the pliers of FIG. 7 taken generally along line 10a-10a in FIG. 10.

FIG. 10b is a cross-sectional view of a cutter of the pliers of FIG. 7 taken generally along line 10b-10b in FIG. 10.

FIG. 10c is a cross-sectional view of a locking assembly of the pliers of FIG. 7 taken generally along line 10c-10c in FIG. 10.

FIG. 10d is a cross-sectional view of a handle portion of the pliers of FIG. 7 taken generally along line 10d-10d in FIG. 10.

FIG. 10e is a cross-sectional view of a handle portion of the pliers of FIG. 7 taken generally along line 10e-10e in FIG. 10.

FIG. 10f is a cross-sectional view of a lanyard opening of the pliers of FIG. 7 taken generally along line 10f-10f in FIG. 10.

FIG. 10g is a planar view of the end of the handle portion of the pliers of FIG. 7.

FIG. 11 is a top view of the pliers of FIG. 7.

FIGS. 18A-18K are top views illustrating a minimum viewing angle of stripping apertures of the wire stripper of FIG. 13.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Figure 1:
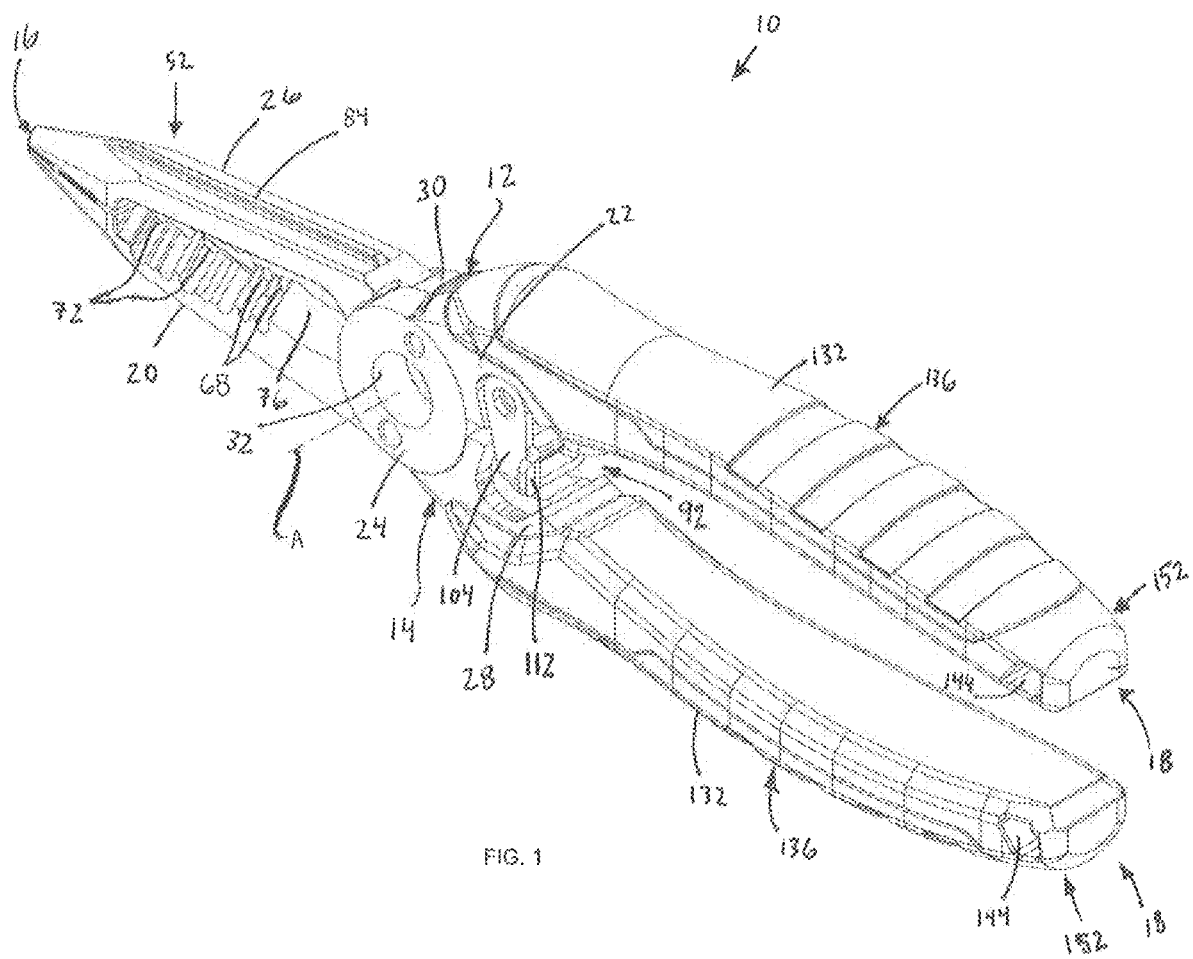
FIG. 1 is a perspective view of a hand tool, such as a wire stripper.

FIG. 1 illustrates one construction of a hand tool, such as a wire stripper 10. The illustrated wire stripper 10 is a combination wire stripper and needle-nose electrician's pliers. The wire stripper 10 includes a first jaw assembly 12 and a second jaw assembly 14. Each assembly 12, 14 has a jaw end 16 and a handle end 18.

The first assembly 12 includes a first jaw portion 20, a first handle portion 22 and a first pivot portion 24 disposed between the first jaw portion 20 and the first handle portion 22. Similarly, the second jaw assembly 14 includes second jaw portion 26, a second handle portion 28, and a second pivot portion 30 disposed between the second jaw 26 portion and the second handle portion 28. The first pivot portion 24 and second pivot portion 30 each define a pivot aperture 32. The assemblies 12, 14 are pivotally coupled about a pivot axis A defined by a pivot pin 34 (FIG. 4) disposed within the pivot apertures 32.

Figure 2:
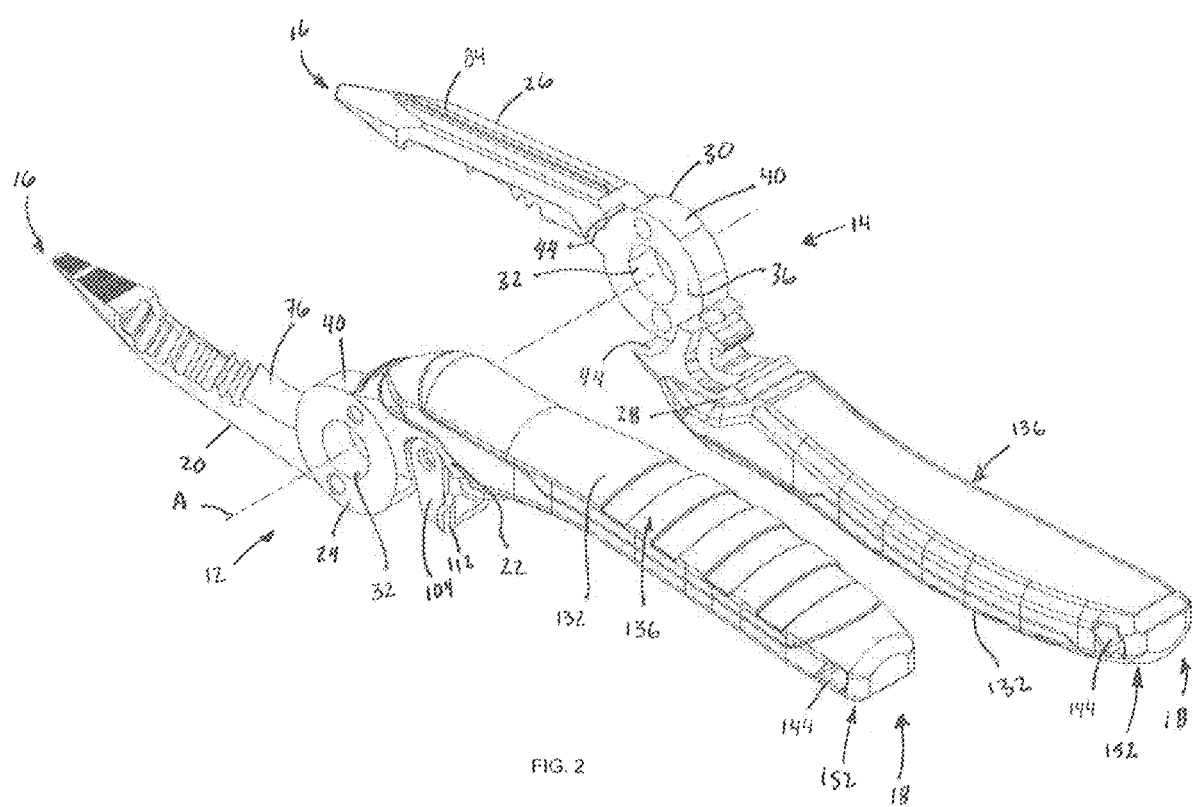
FIG. 2 is a partially exploded view of the wire stripper of FIG. 1.

As shown in FIG. 2, each of the pivot portions 24, 30 has a flat surface 36, a circumferential surface 40, and radial abutment surface 44 that extend from the flat surface 36. The pivot portions 24, 30 are configured to nest such that the flat surfaces 36 of the pivot portions 24, 30 abut, and the radial abutment surfaces 44 of the pivot portions 24, 30 abut the circumferential surfaces 40 of the opposite pivot portions 24, 30 to form a box joint. As the assemblies 12, 14 pivot relative to one another about the pivot axis A, the radial abutment surfaces 44 follow the corresponding circumferential surface 40, thus providing support against bending, torsion, etc. The box joint contributes to the stiffness of the wire stripper 10 and inhibits the assemblies 12, 14 from being pried apart, twisted, bent, etc.

With reference to FIG. 1, the first jaw portion 20 and the second jaw portion 26 together define a nose 52 of the wire stripper 10. Each jaw portion 20, 26 tapers to a narrow end 38 such that the wire stripper 10 may be described as "needle-nose" pliers.

In the illustrated embodiment, each assembly 12, 14 (e.g., the associated jaw portion 20, 26, handle portion 22, 28, and pivot portion 24, 30) is formed as one piece from metal, such as alloy steel, through a forging process. The forging process can create protrusions and recesses on different planes (e.g., the first pivot portion 24 and the second pivot portion 30 to be formed on different planes, thus providing the capability for the pivot portions 24, 30 to form a box joint).

The assemblies 12, 14 of the wire stripper 10 are pivotable about an axis of the pivot pin 60 between a closed position and an open position. In the closed position, the jaw portions 20, 26 are in contact with one another, as illustrated in FIG. 1. In the open position (not shown), the jaw portions 20, 26 are spaced from one another.

As shown in FIGS. 1 and 4, apertures 68 extend through the nose 52 of the wire stripper 10. With reference to FIG. 4, the jaw portions 20, 26 cooperate to form the apertures 68, with a portion (e.g., one half) of each aperture 68 being formed in each jaw portion 20, 26. The apertures 68 are constructed and arranged to strip insulation from a wire, without substantial penetration of the underlying wire core. Each aperture 68 has a different diameter so that each aperture may be used to strip wire of a different size or gauge.

The illustrated wire stripper 10 further includes elongated apertures 72 that also extend through the nose 52. The elongated apertures 72 are each made up of several overlapping circular apertures spaced along the nose 52 and are configured for stripping insulation from Romex® non-metallic (NM) wire. Romex® wire, available from Southwire Company LLC, includes a number of separate conductors (wires) covered in a single non-metallic (NM) sheathing. In the illustrated embodiment, there are multiple elongated apertures 72 configured to strip Romex® wire of different sizes (e.g., 12/2 and 10/2 as shown in FIG. 4). Each of the elongated apertures 72 is configured to strip the sheathing from all of the conductors of a Romex® wire of the appropriate size.

The apertures 68, 72 are arranged in a bypass configuration. The apertures 68, 72 define a stripping length that extends along an overall length of the jaw portions 20, 26.

The first jaw portion 20 and second jaw portion 26 each include a beveled edge 76 extending along the length of the jaw portions 20, 26 and directly from the circumferential surfaces 40 of the pivot portions 24, 30. The beveled edges 76 act in conjunction to define a cutter 80 for wire or similar materials. As shown in FIG. 4b, the beveled edges 76 are arranged in a bypass configuration to increase the shear force applied to material cut by cutter 80.

To provide the bypass configuration while having the jaw portions 20, 26 overlie each other, complementary open areas are provided (e.g., material is removed) in the area of the bypass. Thus, on one jaw portion 20, the structure defining the apertures 68, 72 and the beveled edge 76 is provided on one side of a longitudinal plane, while, on the other jaw portion 26, the structure is provided on the other side of that plane. Each jaw portion 20, 26 defines an open area to receive the structure of the other jaw portion 20, 26 as the jaw portions 20, 26 are closed.

As shown in FIGS. 1-6, each jaw portion 20, 26 is formed with a rib 84 to provide a pipe reamer. The illustrated ribs 84 are formed longitudinally along a parting line of the forging tool during the forging process.

The illustrated ribs 84 extend longitudinally along and are approximately centered across the width of the jaw portions 20, 26. Each rib 84 projects outwardly from the associated jaw portion 20, 26 and has a transverse end surface and adjacent substantially perpendicular lateral surfaces arranged to provide reaming edges. The ribs 84 taper down to the narrow end 38 following the contour of the jaw portions 20, 26. In the illustrated construction, each rib 84 has a height of approximately 0.03 inches to 0.05 inches (FIG. 4) and a width RW of approximately 0.06 inches to 0.07 inches (FIG. 5).

To use the wire stripper 10 as a reamer, the user inserts the nose of the wire stripper 10 into a pipe, conduit or similar structure, until the rib(s) 84 contact the structure wall. The user pivots the structure or wire stripper 10 to remove burrs and smooth the wall.

The ribs 84 contribute to increased stiffness of each jaw portion 20, 26. The ribs 84 may compensate for material removed from the jaw portion 20, 26 to provide the bypass configuration. The stiffness of the jaw portions 20, 26 inhibits the jaw portions 20, 26 from being pried apart and/or bent when using the wire stripper 10 in a twisting, torqueing fashion (e.g., as a pipe reamer, when punching and twisting electrical knock outs, etc.).

Twisting or torqueing the jaw portions 20, 26 may damage the connection between the pivot portions 24, 30 and/or bend the jaw portions 20, 26, causing the jaw portions 20, 26 to be misaligned. Misalignment of the jaw portions 20, 26 causes the halves of each aperture 68 to be misaligned, impeding and potentially preventing the stripping and cutting capability of the wire stripper 10. Specifically, if the cutting edges of the apertures 68 are not aligned in a plane, one portion of the apertures 68 may cut the insulation while the opposite portion cuts too deeply (and into the wire) or not deep enough (failing to completely cut the insulation to facilitate stripping). The greater the distance from the pivot axis A, the greater the effect of bending or misalignment of the jaw portions 20, 26 has on the stripping operation. Similarly, the greater the width of the wire (e.g., NM wire versus solid or stranded wire), the greater the effect of bending or misalignment of the jaw portions 20, 26 has on the stripping operation for that wire.

Increasing the stiffness of the jaw portions 20, 26 (e.g., with the ribs 84, the box joint, the use of forged assemblies 12, 14) limits the potential damage to the pivot portions 24, 30 and/or the jaw portions 20, 26 from twisting/torqueing operations, improving stripping capabilities of the wire stripper 10. As mentioned above, this improved capability may be important when the elongated apertures 72 are used for wire-stripping (e.g., for NM wire), because the elongated apertures 72 become misaligned to a greater degree due to their increased length. Increased stiffness may also allow for an increased stripping length SL relative to overall length of the jaw portions 20, 26 and for apertures 68, 72 to be positioned further from the pivot axis A without being impacted by misalignment even after using the wire stripper 10 as a reamer, to punch out electrical knock outs, etc.

In the illustrated construction, the wire stripper 10 is constructed with jaw portions 20, 26 have a length (i.e., jaw length JL) measured from the outer surface of the joint to the jaw end 16 of about 2.5". The jaw portions 20, 26 have a width (i.e., jaw width JW) of about 0.33".

In the illustrated construction, each individual jaw 20, 26 has a spring constant of about 2900 pounds per inch (lbs./in.) to about 3000 lbs./in. when a force is applied in a direction parallel to the pivot axis A to the tip of the jaw 20, 26 with the pivot pin 34 being held. In some constructions, the spring constant of each jaw 20, 26 is more than about 2225 lbs./in. or more than about 2250 lbs./in. In still other constructions, the spring constant of each jaw 20, 26 may be more than about 2500 lbs./in., more than about 2750 lbs./in, more than about 2900 lbs./in. or more than about 3000 lbs./in. In some constructions, the spring constant of each jaw 20, 26 may be between about 2300 lbs./in. and about 3200 lbs./in. or between about 2500 lbs./in. and about 3100 lbs./in.

Due to the increased stiffness, the wire stripping portion can extend over a greater portion of the jaw length. For example, in the illustrated construction, the length of the wire stripping portion (i.e., stripping length SL) is about 1.17" and the length JL of the jaw portions 20, 26 is about 2.5". The wire stripper 10 may be constructed with a ratio of the length of the wire stripping portion to the jaw length in a range of 0.40 to 0.55 and, more specifically, in a range of about 0.45 to 0.48. In contrast, some existing combination pliers/wire strippers have a ratio of less than 0.30 (e.g., about only 0.28).

In addition, due to the increased stiffness, the stripping apertures 68, 72 can be positioned farther from the pivot axis A. In the illustrated construction, the distance of the end of the NM stripper aperture farthest from the outer surface of the joint is about 1.8". The distal NM stripper aperture is positioned between about 55% and about 70% of the length of the jaw portions 20, 26. In contrast, some existing combination pliers/wire strippers have a distal end of the farthest aperture positioned at less than 55% of the length of the jaw portions.

As described below in more detail, while having an increased stiffness or spring constant, the wire stripper 10 is constructed such that structure (e.g., recesses on each jaw portion 20, 26) defining the stripping apertures 68, 72 is visible from above when the wire stripper 10 is tilted at a small angle from vertical (e.g., about 15° (close to a top view of the wire stripper 10)), a relatively comfortable work position for the user.

Referring to FIGS. 1, 4, 4c, and 6, the wire stripper 10 includes a lock assembly 92 to selectively hold the jaw portions 20, 26 in the closed position. A locking recess 96 is defined by one of the assemblies 12, 14 (e.g., the second assembly 14 in the illustrated construction). A locking member 104 is pivotably coupled to the other assembly 12, 14 (e.g., the first assembly 12) by a pin 108. The illustrated locking member 104 is a saddle locking member having a generally U-shaped configuration (see FIG. 4c) and connected on opposite sides of the assembly 12. The locking member 104 also has a pair of tabs 112 to allow a user to easily manipulate the locking member 104.

Figure 6:
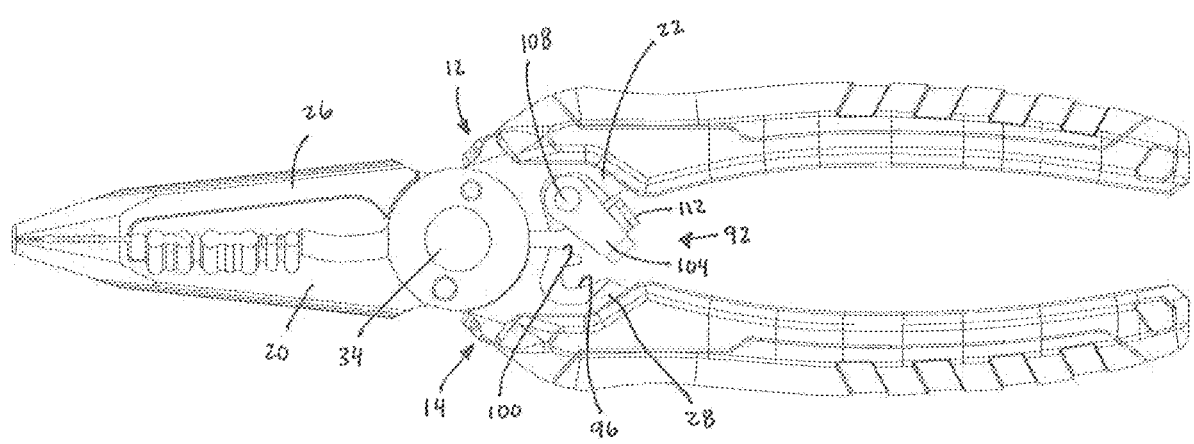
FIG. 6 is a side view of the wire stripper of FIG. 1, illustrating the locking assembly in an unlocked position.

The locking member 104 is pivotable between a first position (see FIG. 4) and a second position (see FIG. 6). When the jaw portions 20, 26 are closed, the locking member 104 is pivoted into engagement with the locking recess 96 (a locking condition (see FIG. 4)), to lock the jaw portions 20, 26 in the closed position (FIG. 4). In an unlocked position (see FIG. 6), the locking member 104 is disengaged from the locking recess 96, thus allowing the wire stripper 10 to be operated (e.g., the jaw portion 20, 26 can be pivoted between the open position and the closed position (FIG. 6)).

An angled surface or ramp surface 100 is adjacent the locking recess 96 and inhibits the locking member 104 from preventing the jaw portions 20, 26 from closing, if the locking member 104 were to be inadvertently pivoted to the first position when the jaw portions 20, 26 are open. More particularly, when the jaw portions 20, 26 are open and the locking member 104 is pivoted to the first position, if the user attempts to pivot the jaw portions 20, 26 closed, the locking member 104 is urged by the ramp surface 100 to pivot away from the first position toward the second position. Thus, when the jaw portions 20, 26 are open, the wire stripper 10 is operable (e.g., the jaw portions 20, 26 may be pivoted between the open position and the closed position) whether or not the locking member 104 is in the first position or second position.

Referring to FIG. 4, the wire stripper 10 includes a handle biasing member 116 disposed between the first handle portion 22 and the second handle portion 28. The illustrated handle biasing member 116 includes a coil spring, though, in other embodiments, another type of biasing member (e.g., a leaf spring) may be used. The biasing member 116 causes the wire stripper 10 to pivot to the open position when the assemblies 12, 14 are unlocked, thus aiding one-handed use of the wire stripper 10.

As shown in FIGS. 4, 4d, and 4e, the handle portions 22, 28 of the assemblies 12, 14 have a T-shaped cross-section 124 formed, in the illustrated construction, in the forging process. The handle portions 22, 28 taper toward the handle end 18 of the handle portions 22, 28, such that the area of the cross-section 124 decreases. As the handle portions 22, 28 are squeezed together during operation, the widened surface of the "T" distributes pressure on the hand of a user, decreasing discomfort during operation. The T-shaped cross-section 124 contributes to increased rigidity and stiffness of the wire stripper 10.

The handle portions 22, 28 are covered with an over-mold 132 (e.g., formed of rubber or similar elastomeric material) to, for example, provide improved gripping, durability, user comfort, etc. The handle portions 22, 28 and the over-molds 132 cooperate to provide the structure of handles 136 for gripping by the user. Each over-mold 132 conforms to T-shaped cross-sections 124 of the handle portions 22, 28. The over-mold 132 is substantially flush with exposed portions 128 of the assemblies 12, 14, to prevent the over-mold 132 from catching on a tool pouch, pockets, or other objects.

As shown in FIG. 4, each handle 136 defines a lanyard opening 144 configured to receive a lanyard, a clip, etc. In the illustrated construction, the lanyard opening 144 is defined in the over-mold 132 and within the periphery of the handle 136, preventing structure defining the lanyard opening from catching on a tool pouch, pockets, other objects, etc. or from being engaged by a user's fingers during operation of the wire stripper 10.

In other constructions (not shown), only one of the handle 136 may include a lanyard opening 144. In other constructions, the lanyard opening(s) 144 may be defined through the handle portion 22, 28 and through the associated over-mold 132 to increase the strength of the lanyard openings 144.

As shown in FIGS. 4f-4g, the wire stripper 10 includes a tactile indicator 152 to distinguish the wire stripper 10 from other wire strippers, pliers, tools, etc. In the illustrated construction, the tactile indicator 152 includes the structure of the lanyard opening(s) 144 on the over-mold(s) 132 at handle end 18. For the wire stripper 10, the over-mold(s) 132 has a substantially continuous shape (e.g., curved and tapering) to, through and beyond the lanyard opening(s) 144. In contrast, for the pliers 10a (see FIGS. 10f-10g), the over-mold 132a has a discontinuity proximate the lanyard opening(s) 144a (e.g., the over-mold narrows or has a cutout). A user can distinguish this difference in structure, even when wearing gloves, to distinguish the wire stripper 10 from the pliers 10a. The tactile indicators 152, 152a are provided within the periphery of the handles 136, 136a to prevent them from catching on a tool pouch, pockets, or other objects.

In other constructions (not shown), the over-mold 132 at the handle end 18 may be formed into any distinguishing shape to provide the tactile indicator 152. In other constructions (not shown), the tactile indicator 152 may include ribs, projections or similar texture formed on the over-mold 132 at the handle end 18.

As shown in FIG. 4g, the illustrated wire stripper 10 also includes a visual indicator 160 (e.g., the characters "NM" to indicate a Romex® NM wire stripper) located on each of the over-molds 132 at the handle end 18.

The pliers 10a include a different visual indicator 160 (e.g., the characters "CP" for combination pliers (see FIG. 10g)) to distinguish between the pliers 10a and the wire stripper 10 without the user needing to look at different operational portions of the tools (e.g., the differences between jaw portions, 20, 26). Thus, the user does not need to completely remove the tools from a tool pouch, pocket, etc. to identify the tools. In the illustrated constructions, the visual indicator 160 contoured on (raised from and/or recessed into) the surface of the over-mold 132. In other constructions (not shown), different visual indicia (e.g., letters, symbols, colors, etc.) may be used in addition to or in place of the illustrated visual indictor 160.

The illustrated wire stripper 10 includes several features, such as needle-nose capability, wire stripping, a wire cutting, a pipe reaming, bolt cutting, loop forming, etc. In other constructions, the wire stripper 10 may include various combinations of these features. Also, in other constructions (not shown), the illustrated features may be incorporated into different hand tools, wire stripper, pliers, etc.

FIGS. 7-12 illustrate another construction of a hand tool, such as combination pliers 10a. The pliers 10a have a similar construction to the wire stripper 10, and common components have the same reference number "a".

Figure 7:
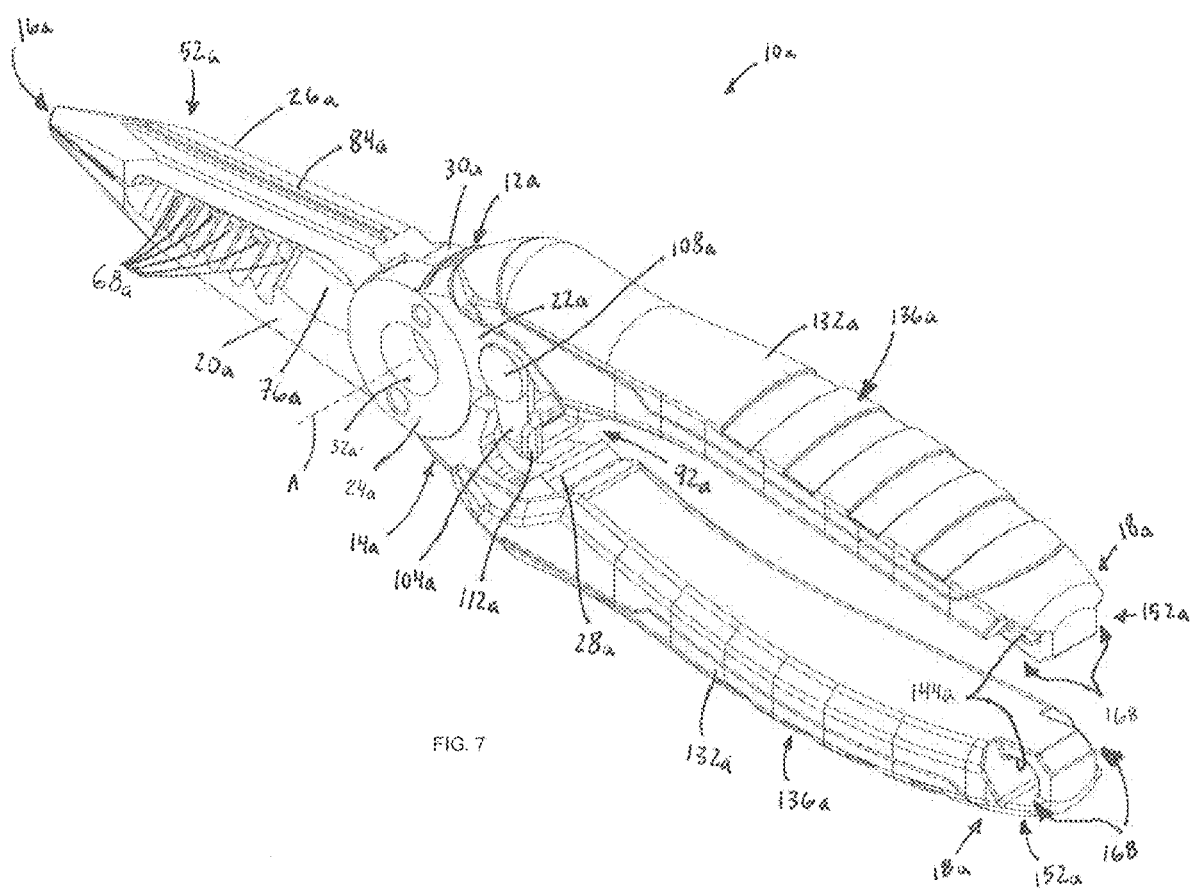
FIG. 7 is a perspective view of a hand tool, such as combination pliers.
Figure 6:
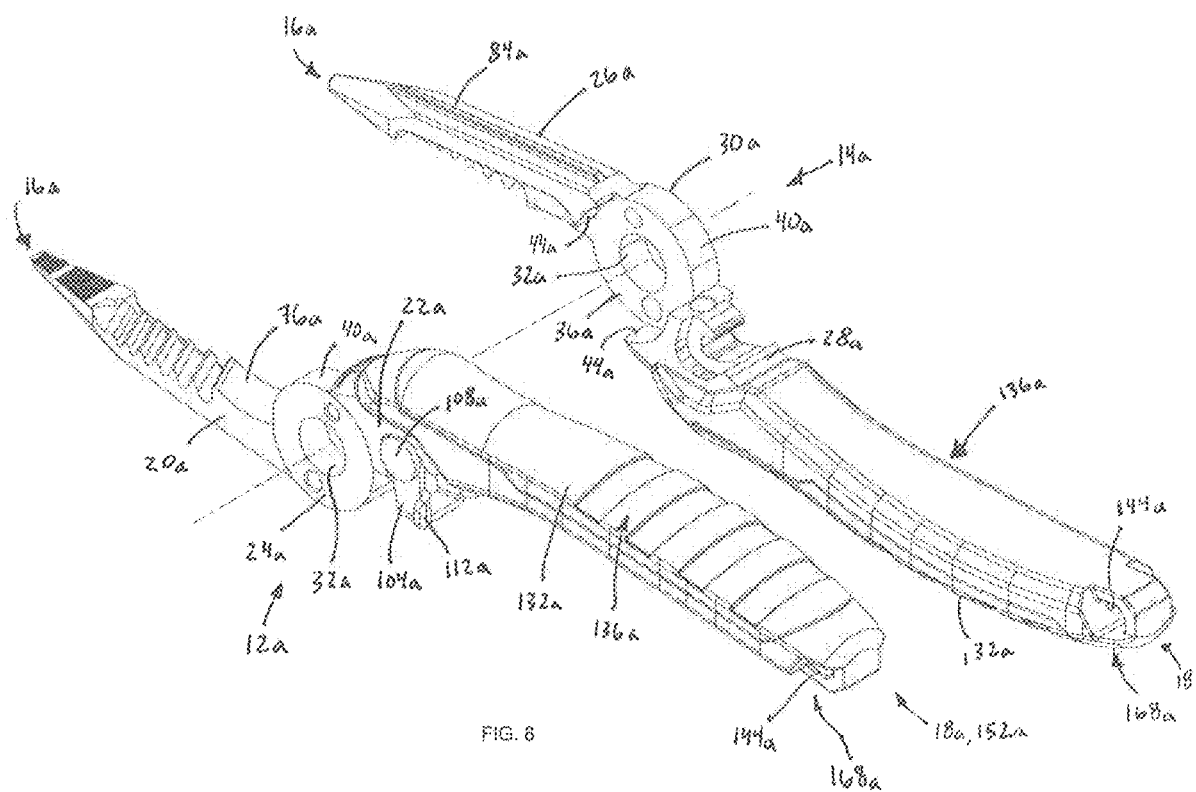
Figure 12:
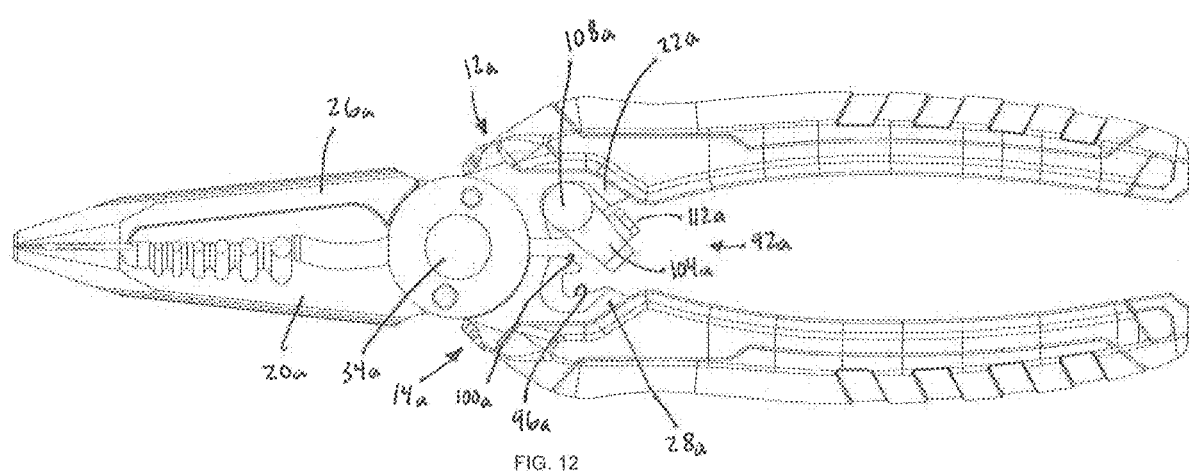
FIG. 12 is a side view of the pliers of FIG. 7, illustrating the locking assembly in an unlocked position.
Figure 13:
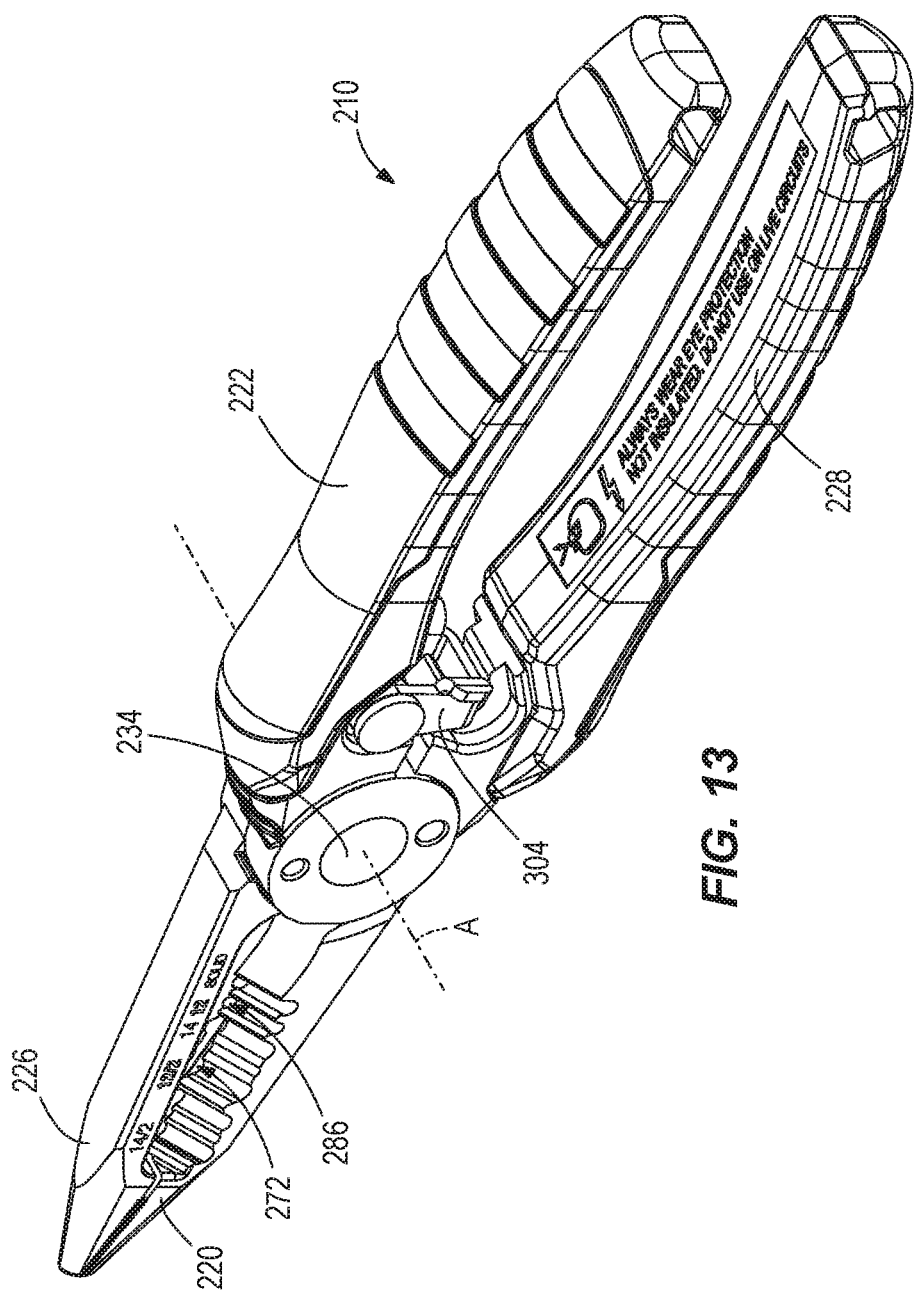
FIG. 13 is a perspective view of a hand tool, such as a wire stripper.
Figure 14:
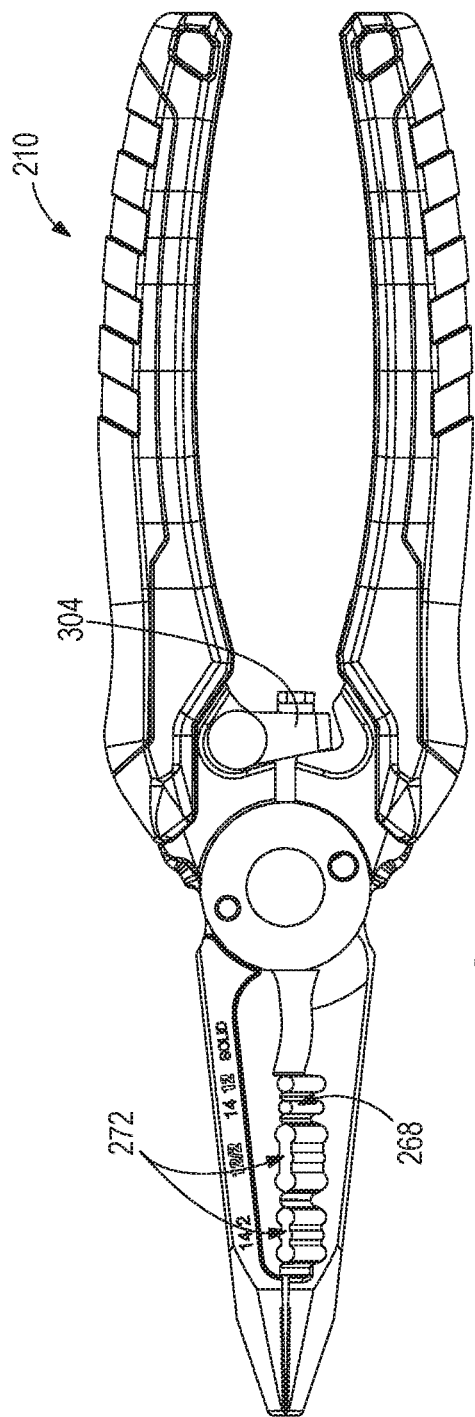
FIG. 14 is a side view of the wire stripper of FIG. 13.
Figure 15:
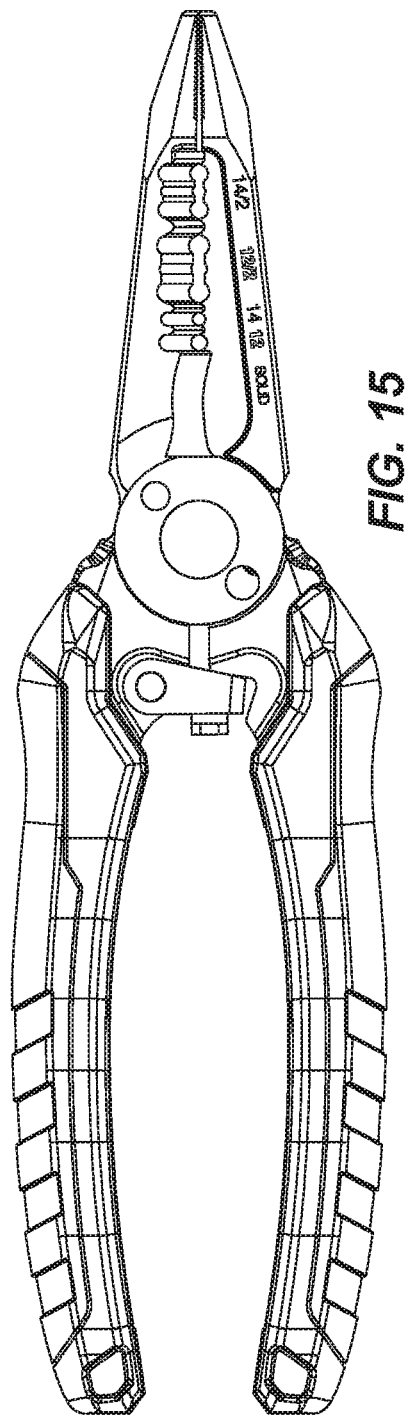
FIG. 15 is a side view of the wire stripper of FIG. 13.
Figure 16:
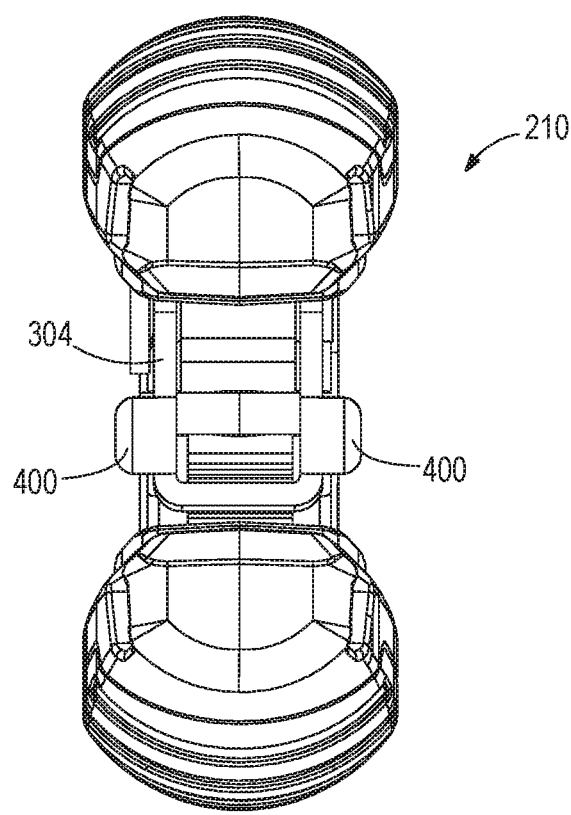
FIG. 16 is a rear view of the wire stripper of FIG. 13.
Figure 17:
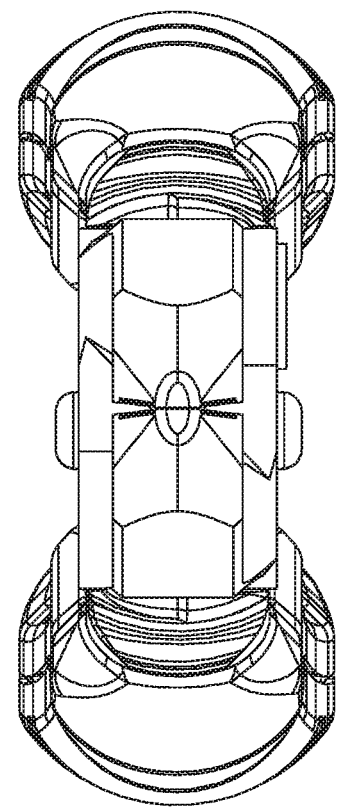
FIG. 17 is a front view of the wire stripper of FIG. 13.
Figure 18C:
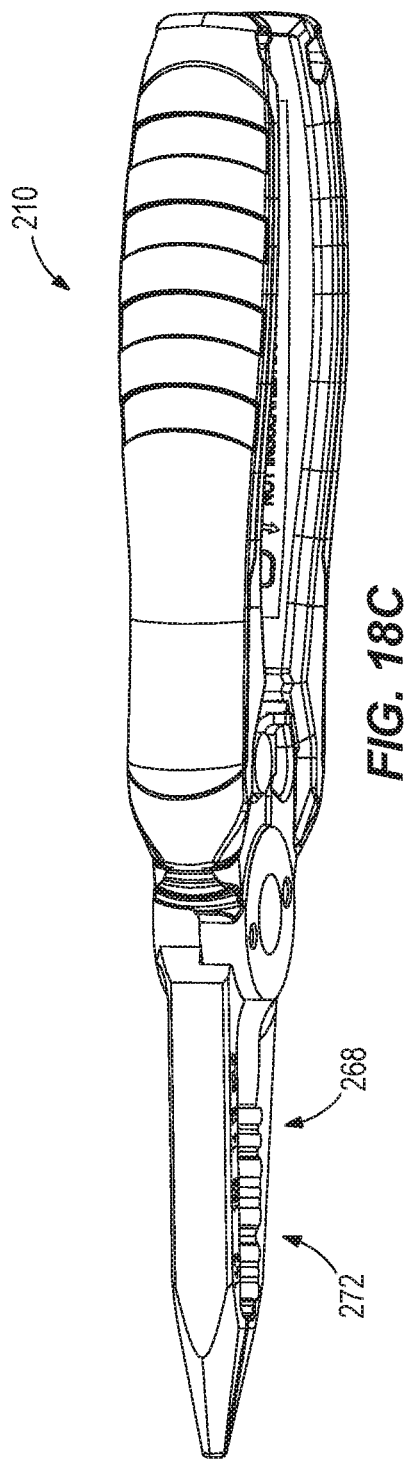
Figure 18D:
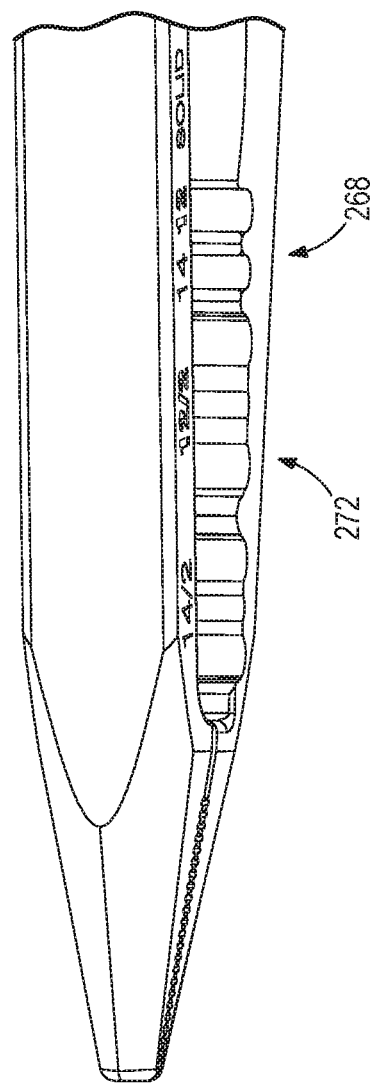
Figure 18E:
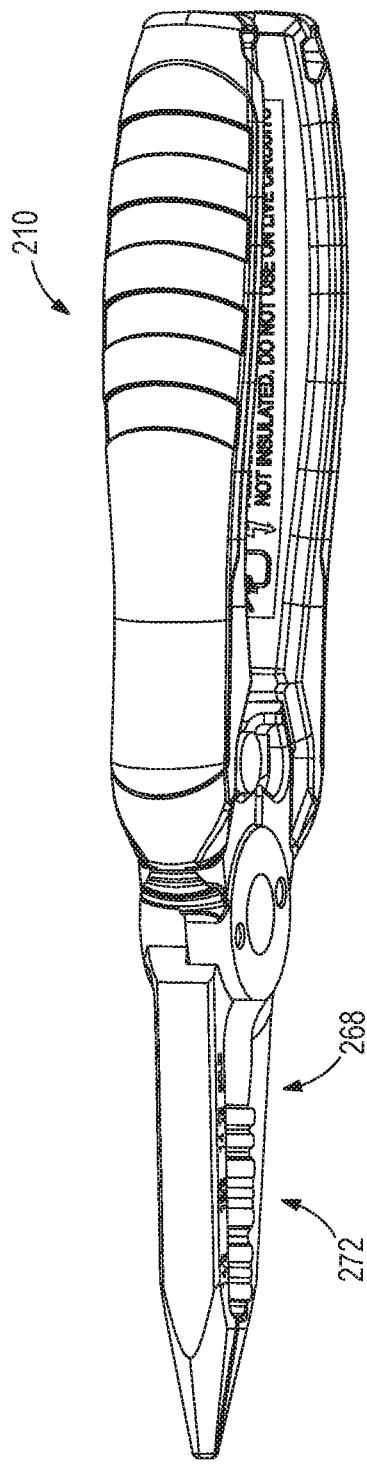
Figure 18F:
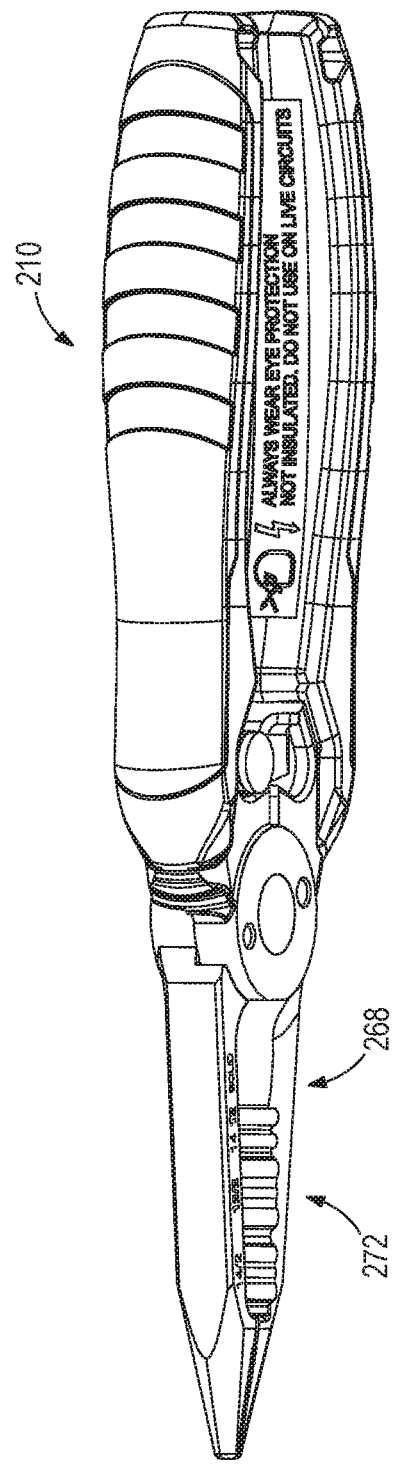
Figure 18G:
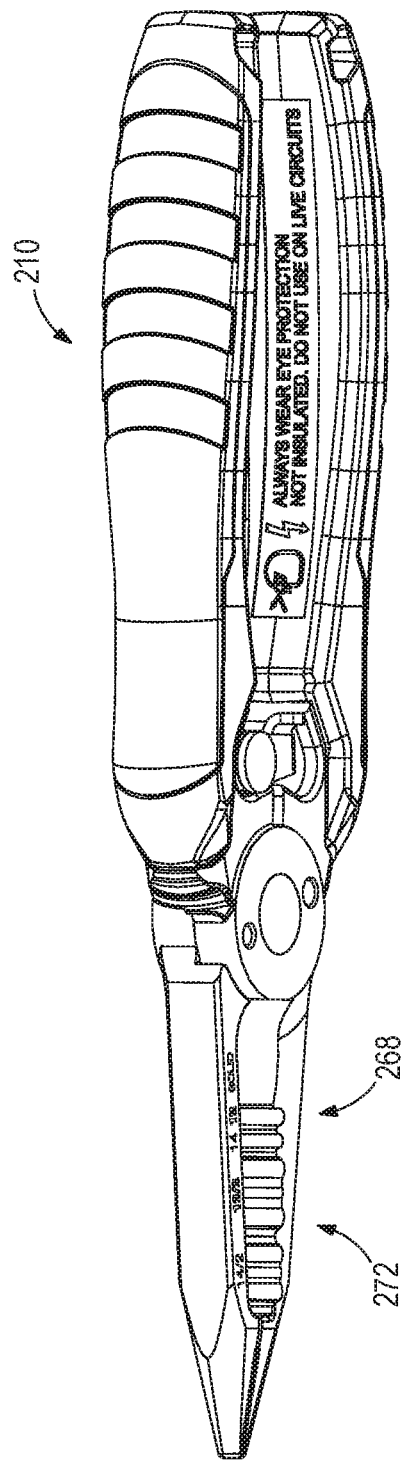
Figure 18H:
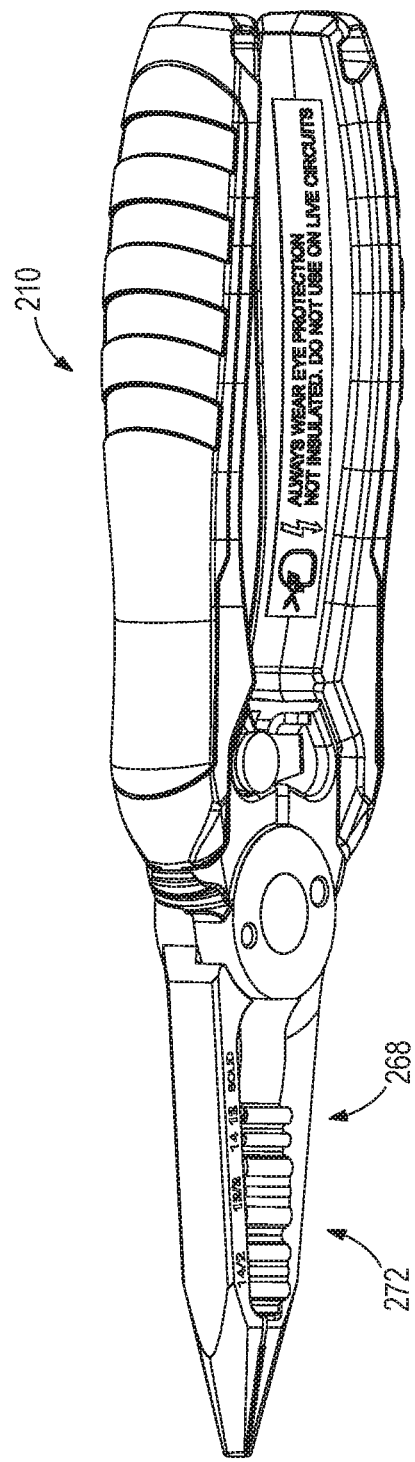
Figure 18I:
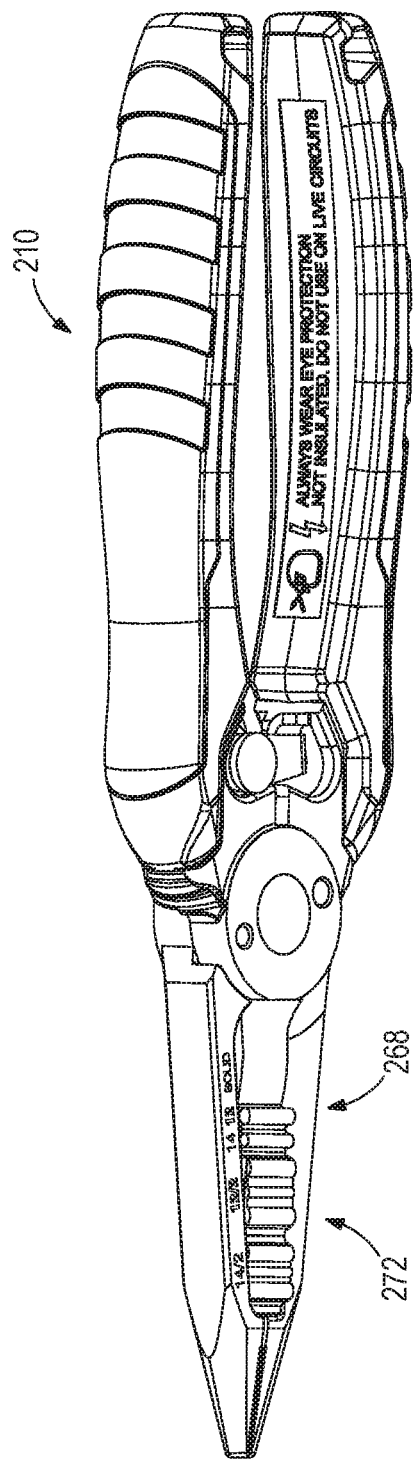
Figure 18J:
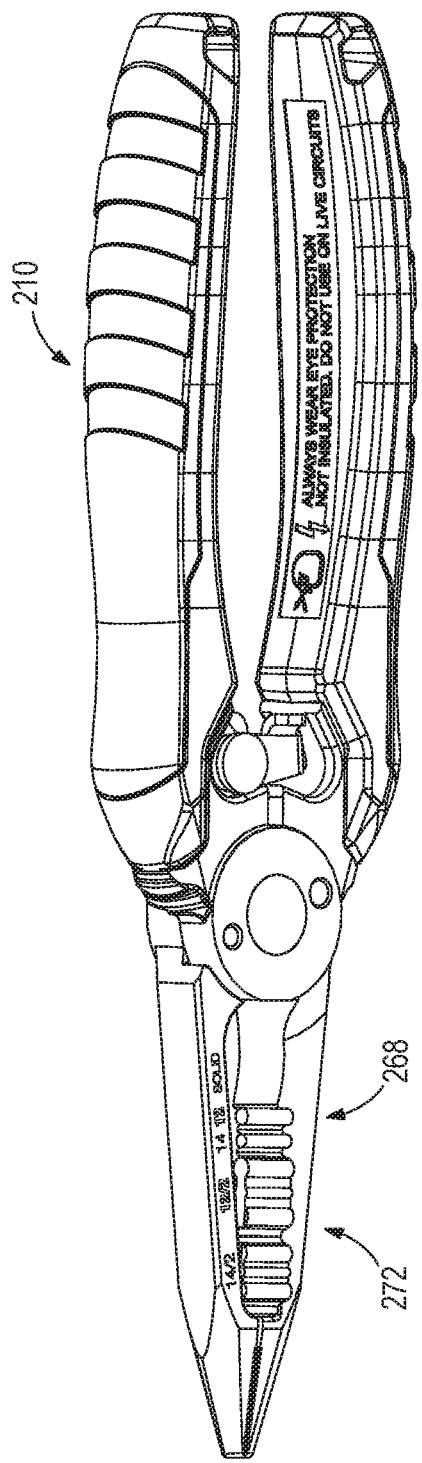
Figure 18K:
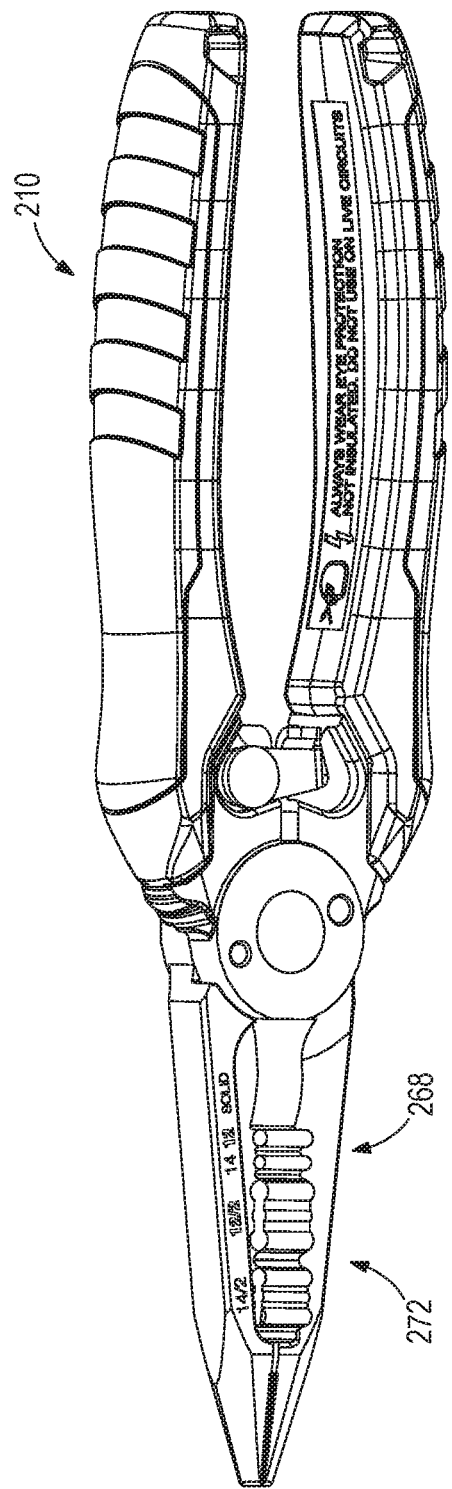
Figure 19:
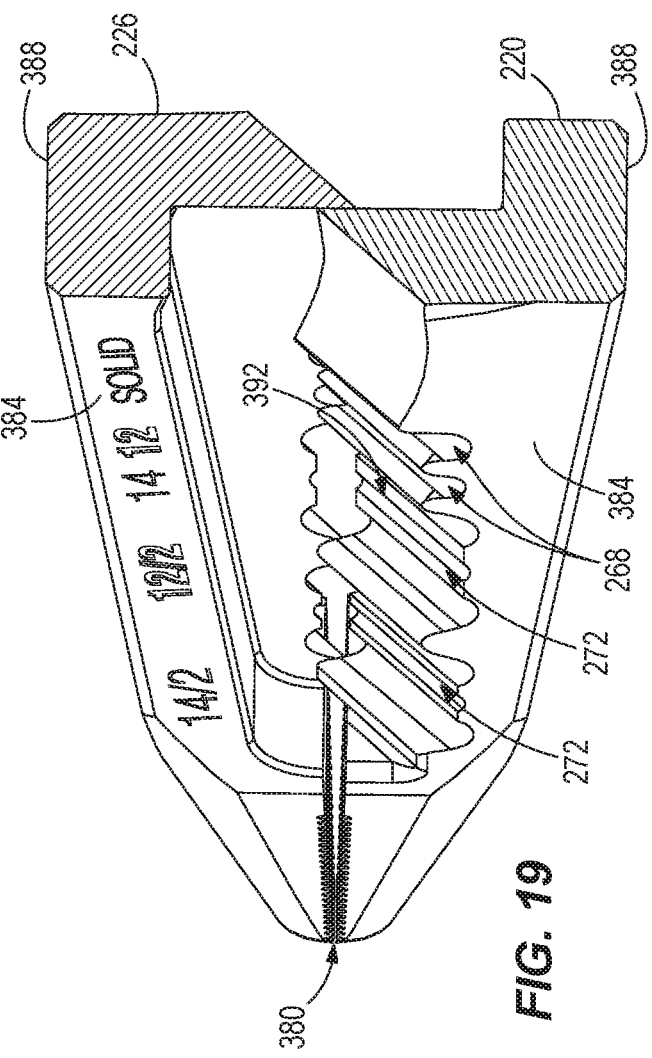
FIG. 19 is a perspective view of jaw portions of the wire stripper of FIG. 13.
Figure 20:
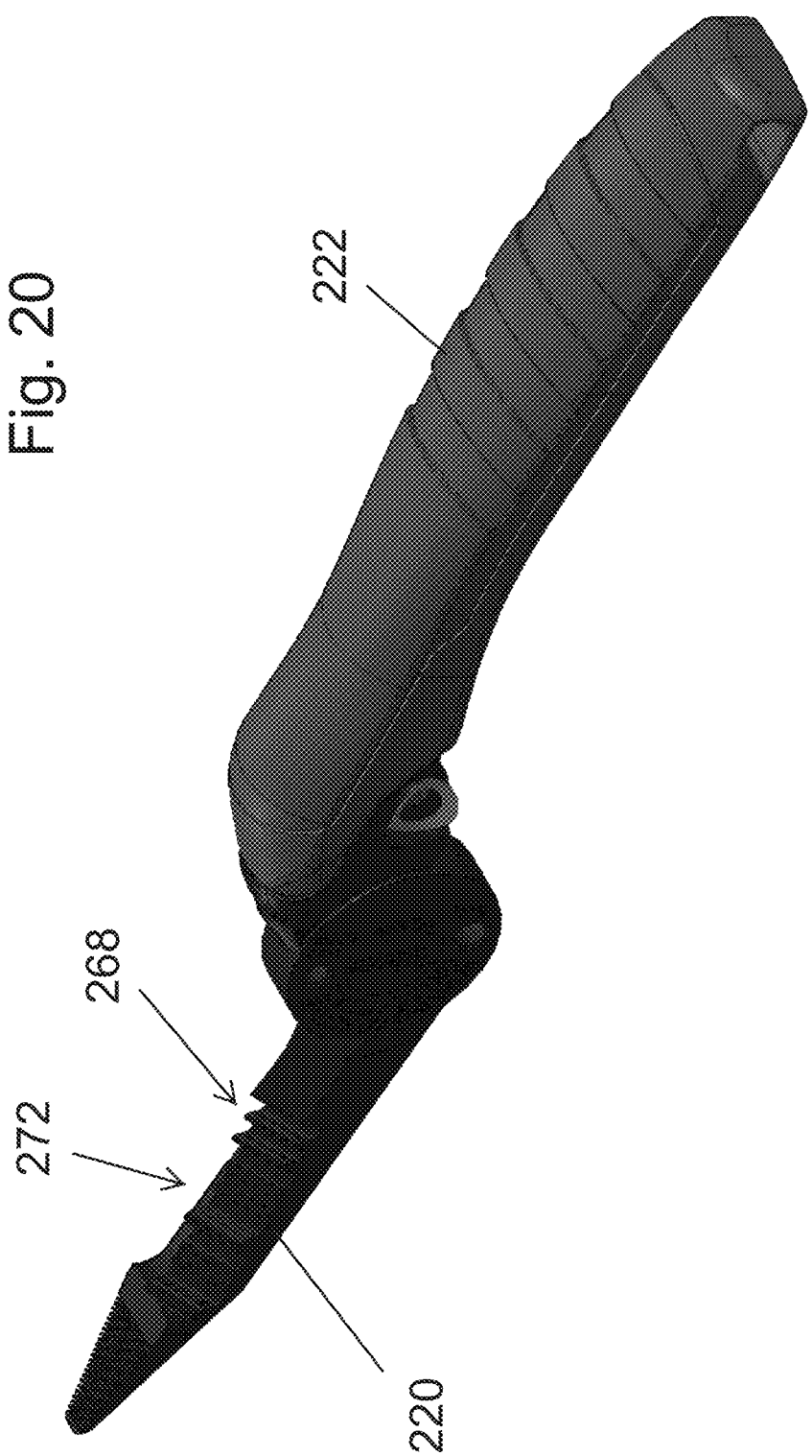
FIG. 20 is a perspective view of a jaw assembly of the wire stripper of FIG. 13.
Figure 21:
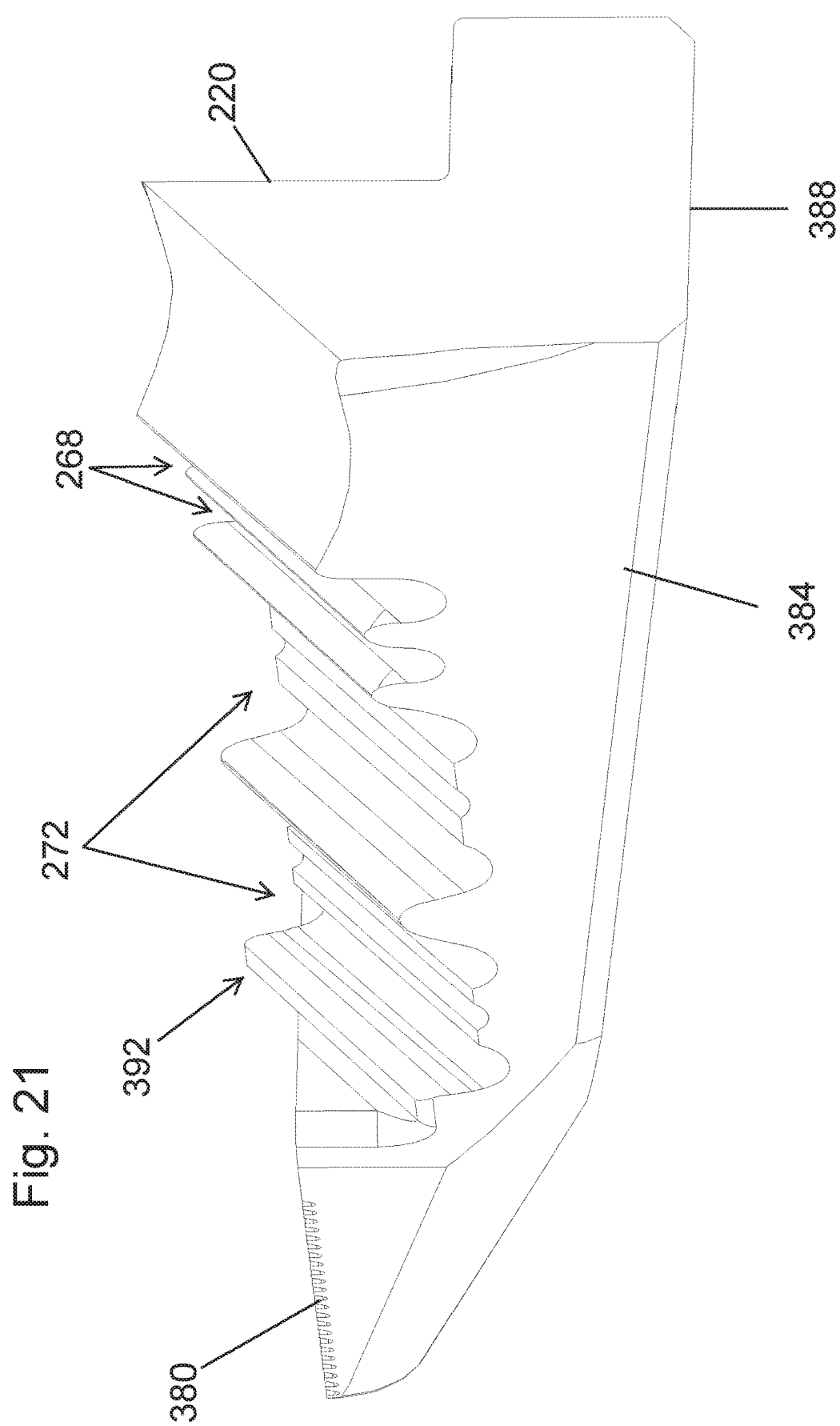
FIG. 21 is a perspective view of the jaw portion of the jaw assembly shown in FIG. 20.
Figure 22:
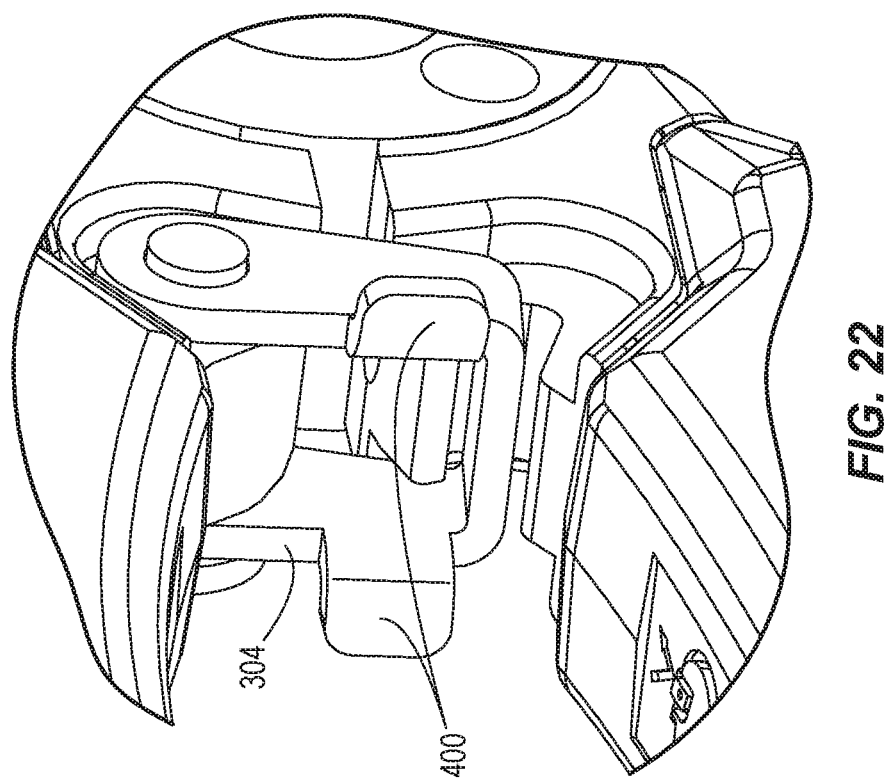
FIG. 22 is an enlarged rear perspective view of a locking assembly of the wire stripper of FIG. 13.
Figure 23:
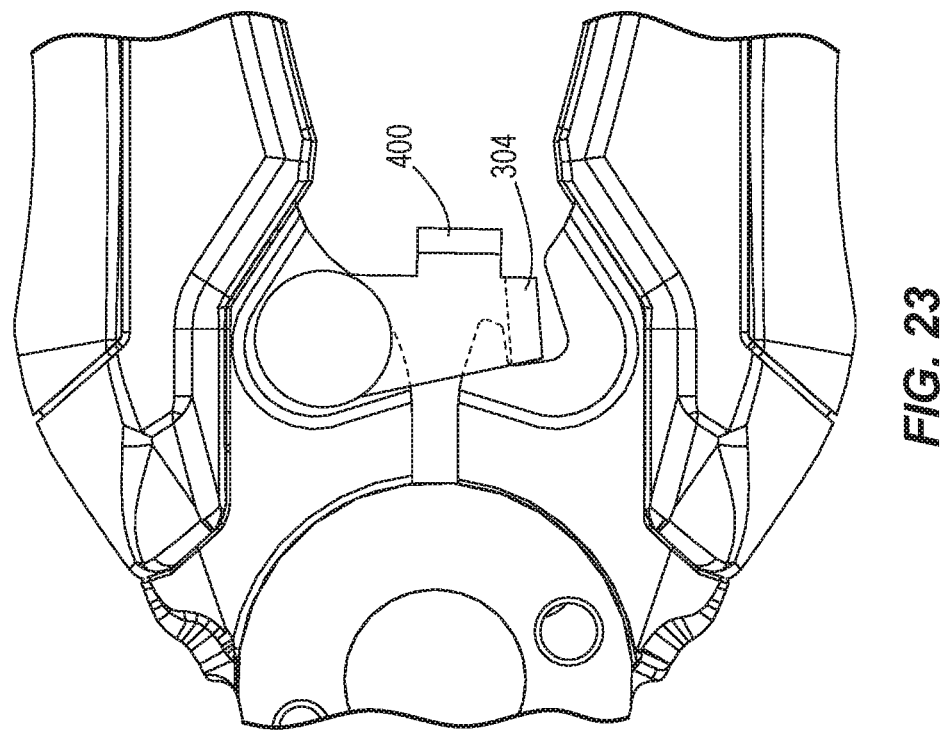
FIG. 23 is an enlarged side view of the locking assembly shown in FIG. 22, with the locking member illustrated as transparent.
Figure 24:
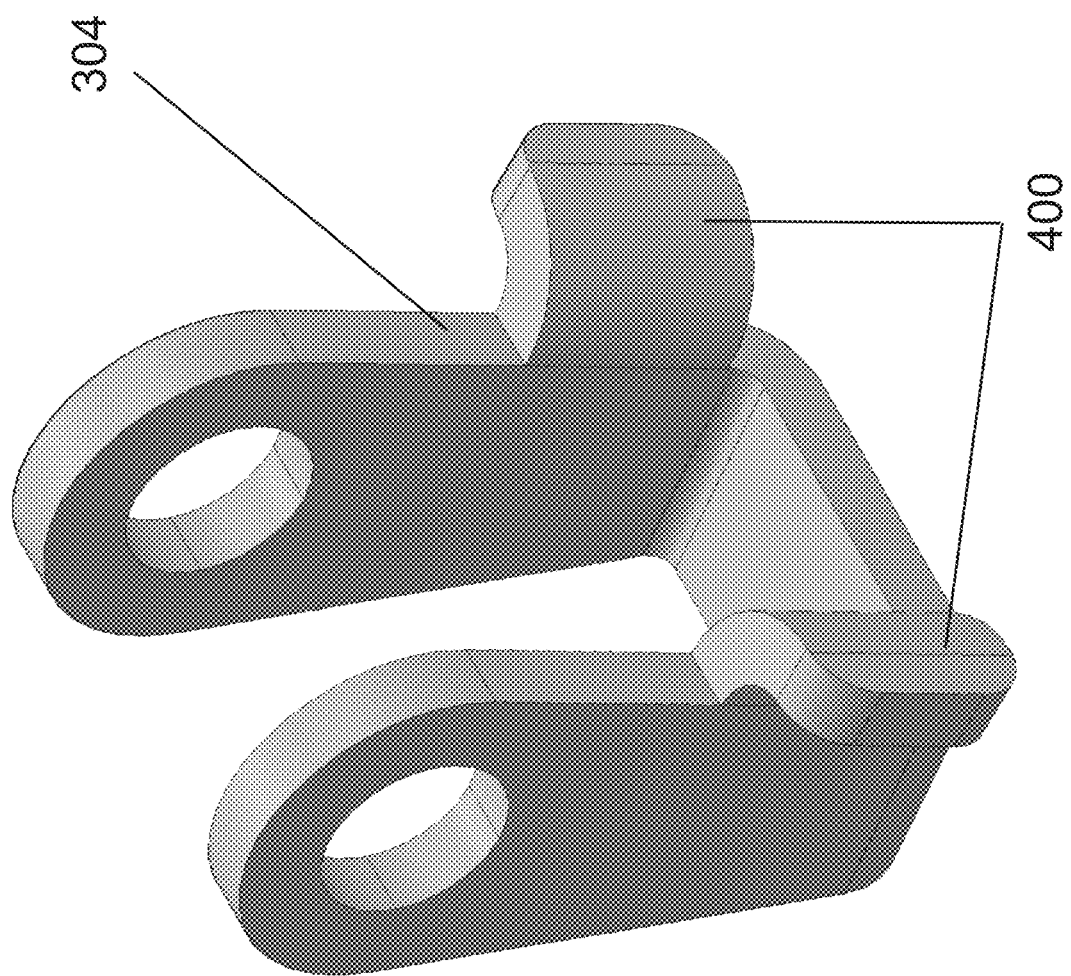
FIG. 24 is a perspective view of the locking member shown in FIG. 22.
Figure 25:
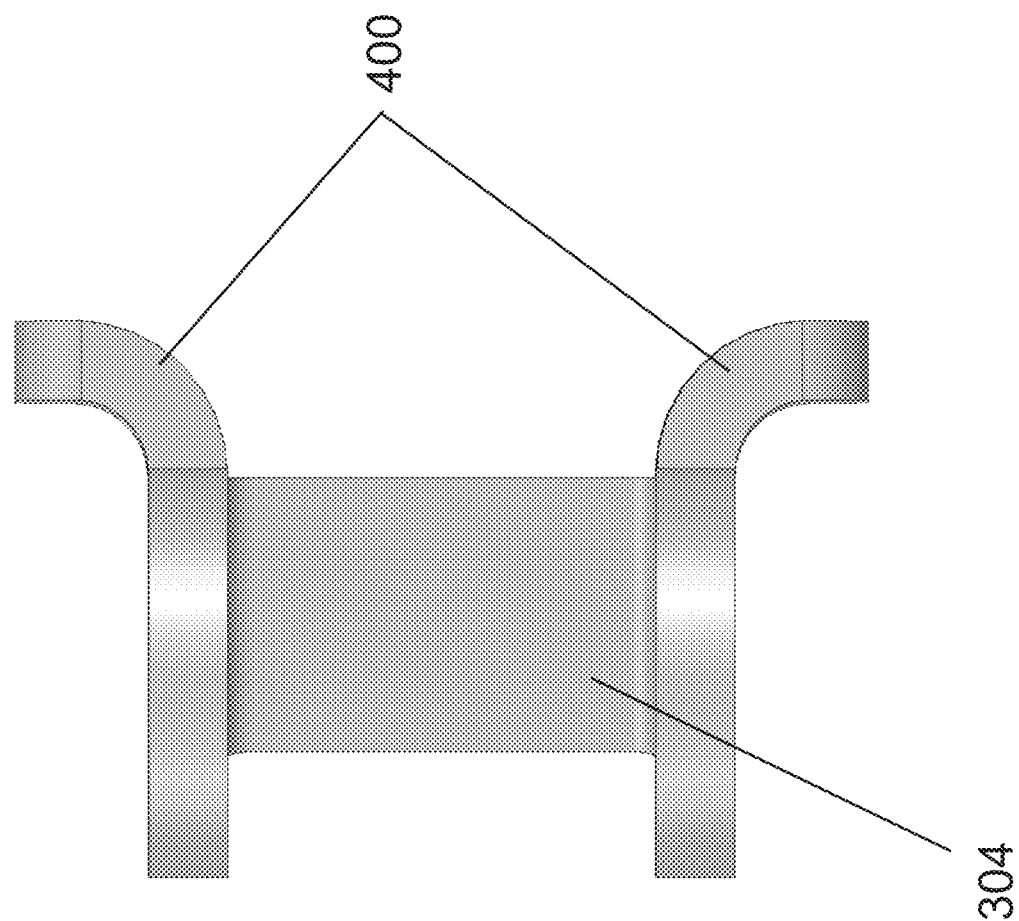
FIG. 25 is an end view of the locking member shown in FIG. 24.
Figure 26:
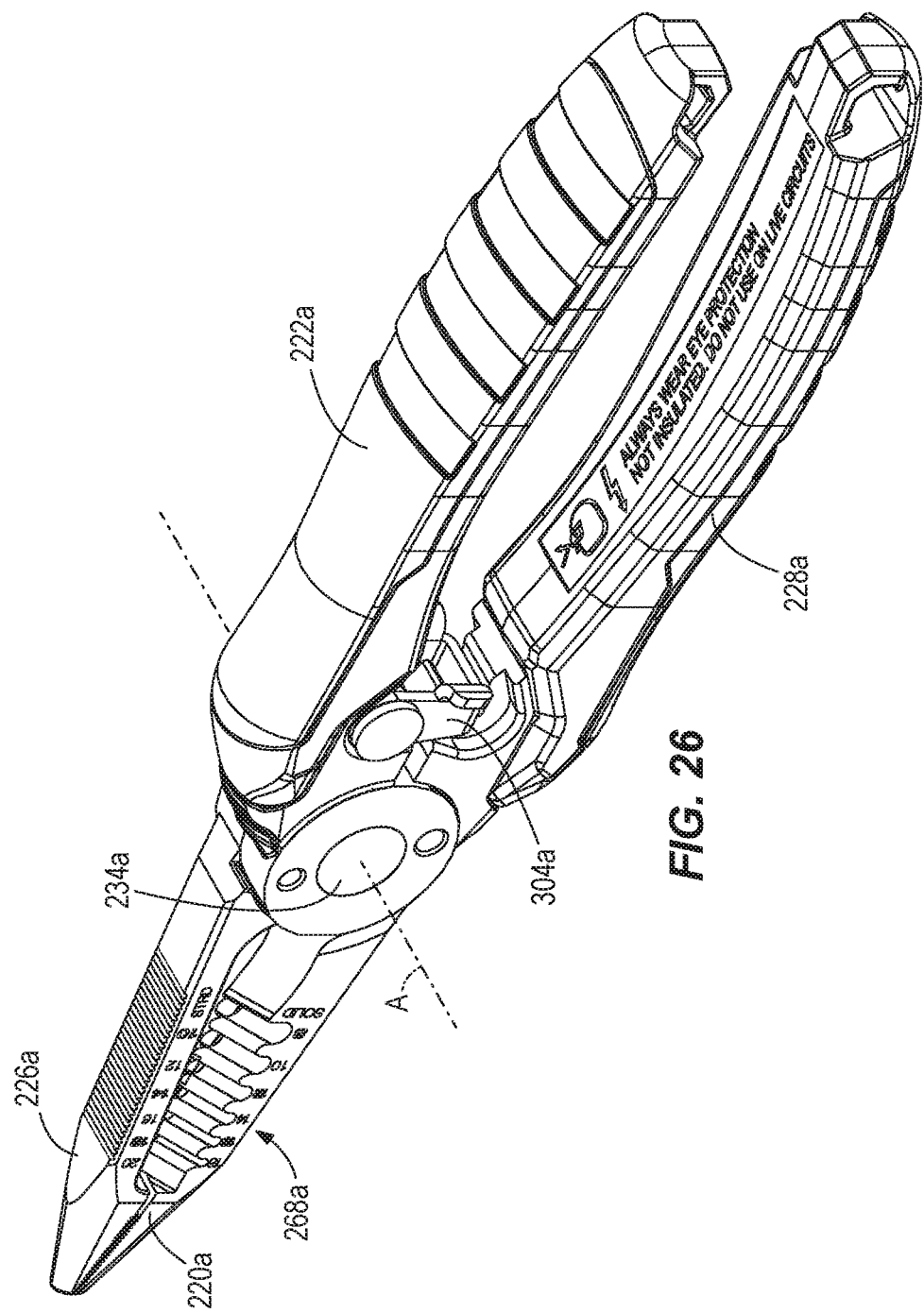
FIG. 26 is a perspective view of a hand tool, such as combination pliers.
Figure 27:
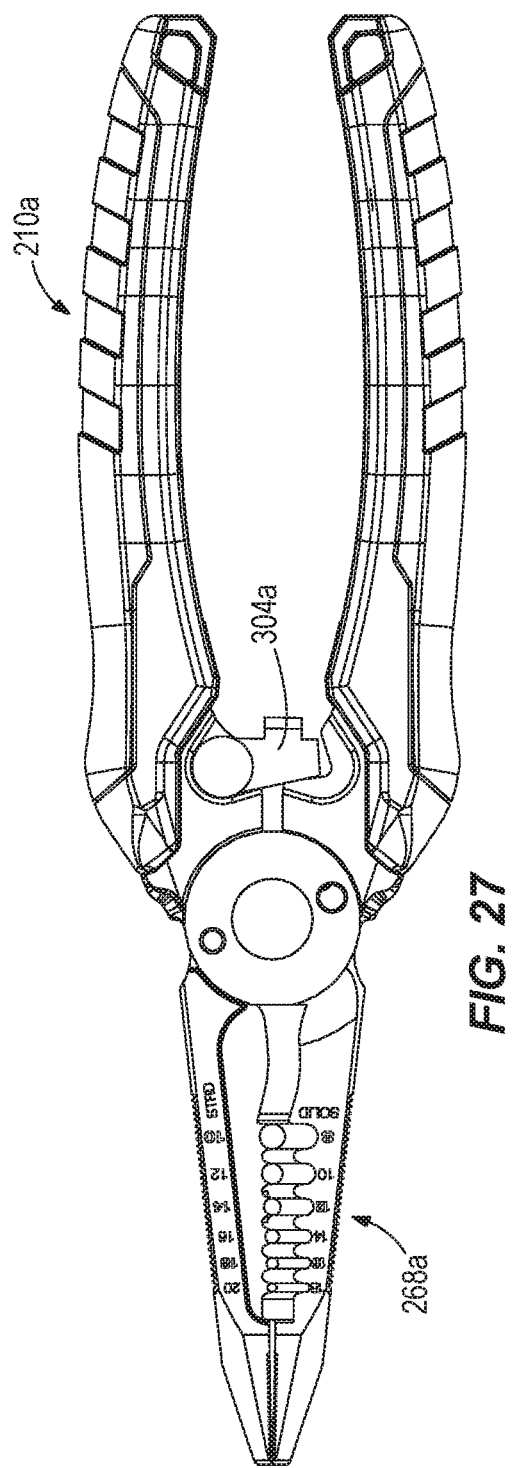
FIG. 27 is a side view of the pliers of FIG. 26.
Figure 28:
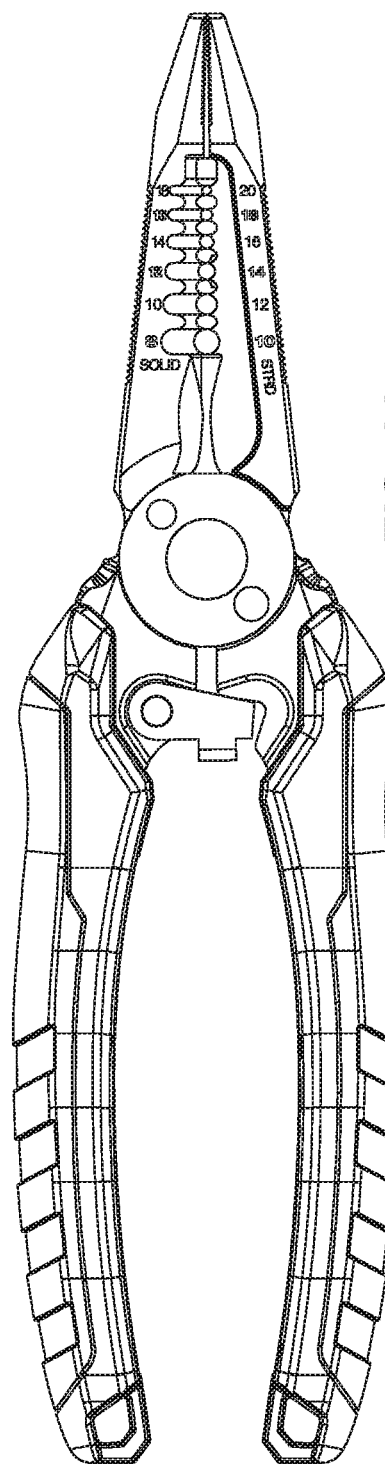
FIG. 28 is a side view of the pliers of FIG. 26.
Figure 29:
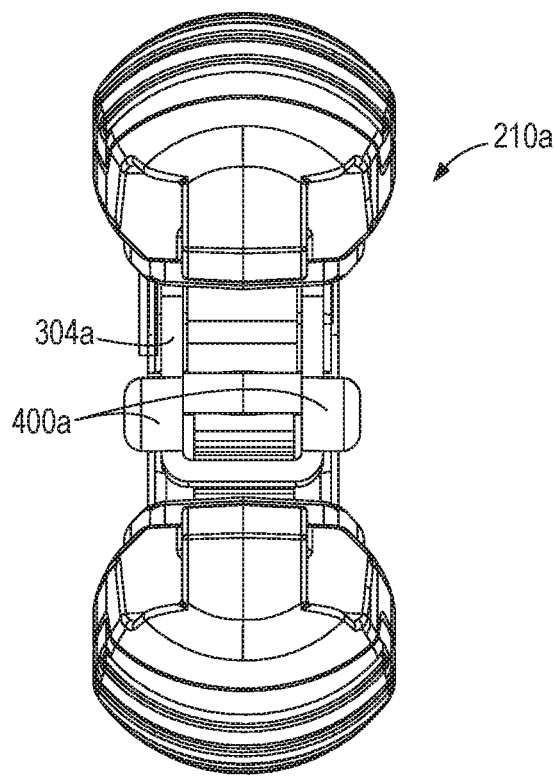
FIG. 29 is a rear view of the pliers of FIG. 26.
Figure 30:
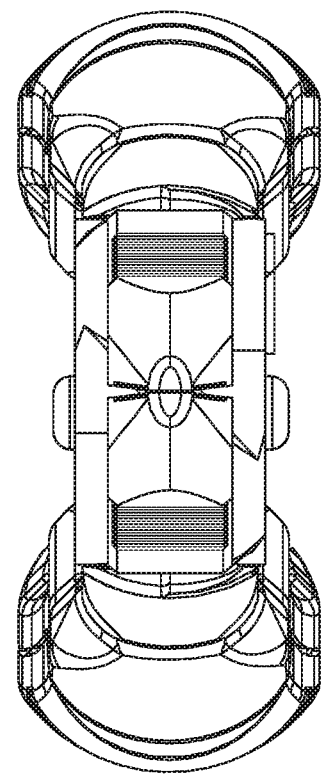
FIG. 30 is a front view of the pliers of FIG. 26.
Figure 31A:
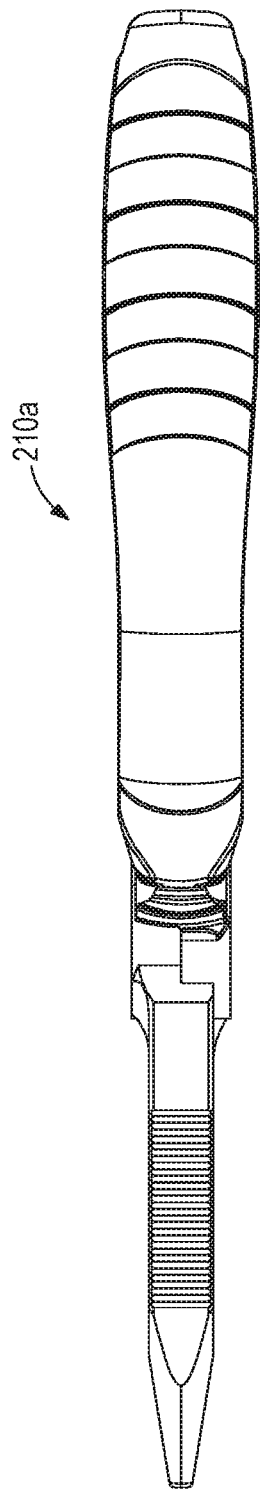
FIGS. 31A-31G are top views illustrating a minimum viewing angle of stripping apertures of the pliers of FIG. 26.
Figure 31B:
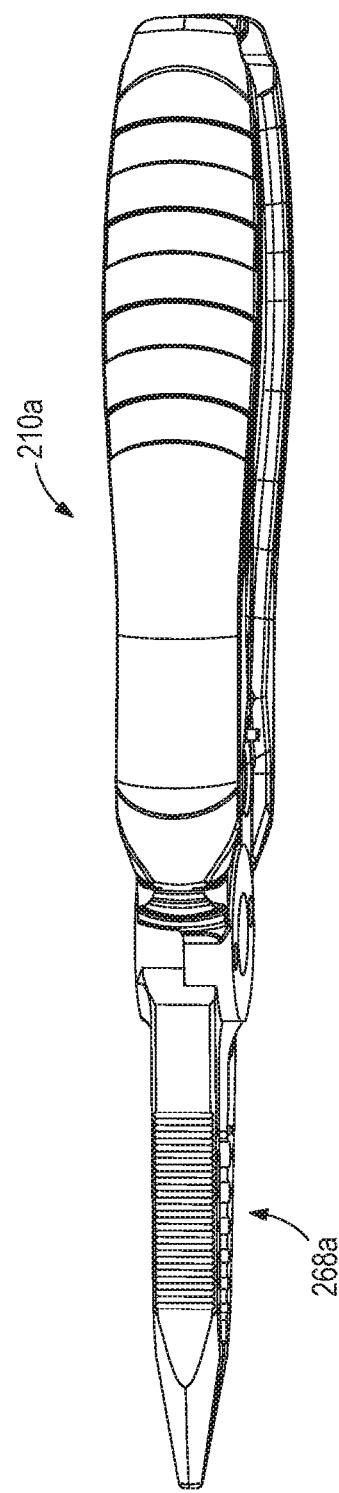
Figure 31C:
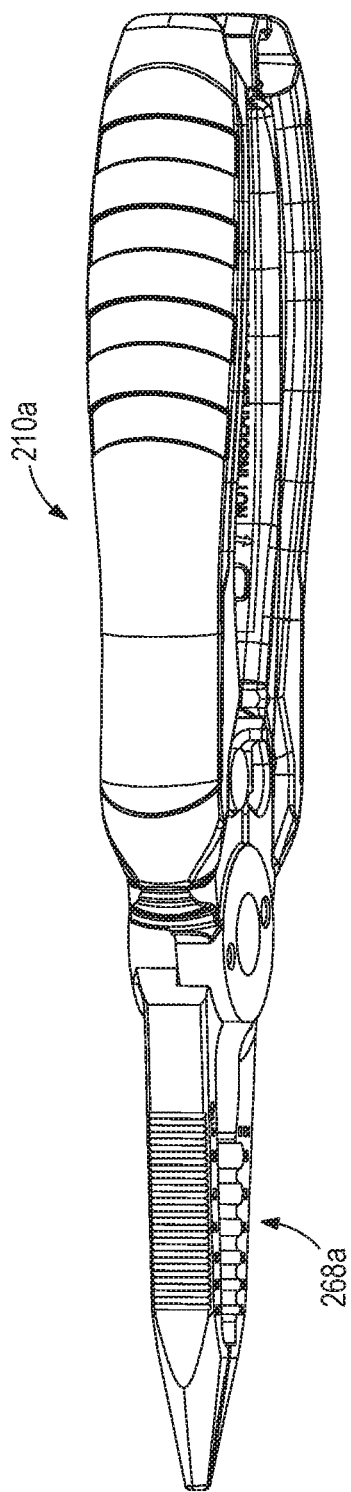
Figure 31D:
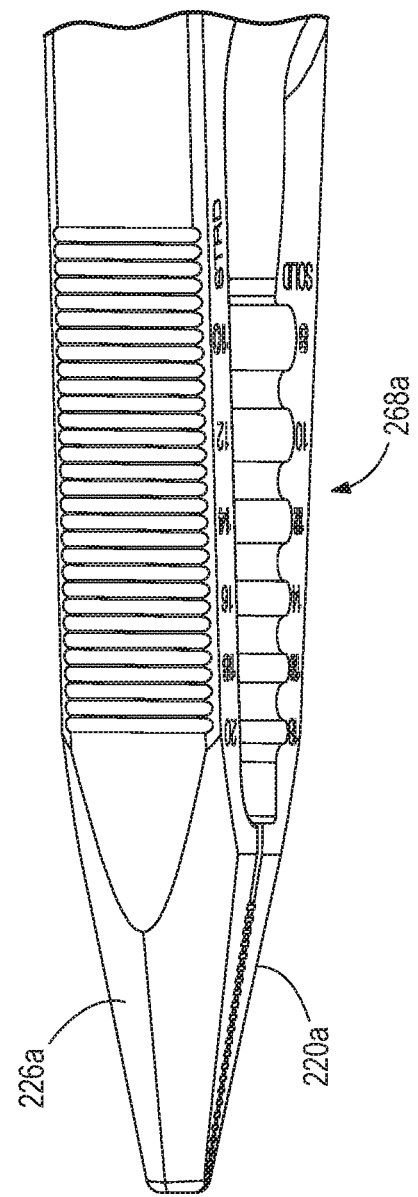
Figure 31E:
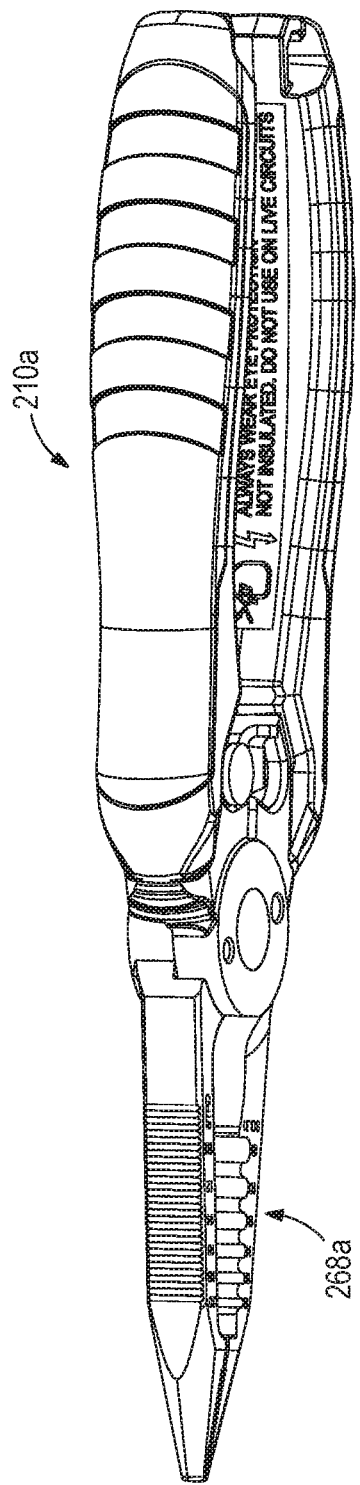
Figure 31F:
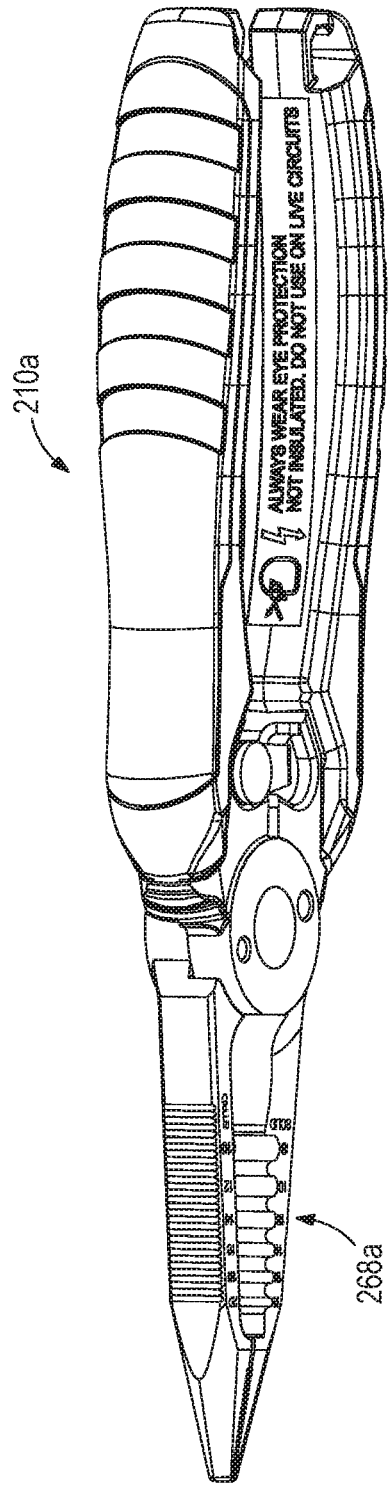
Figure 31G:
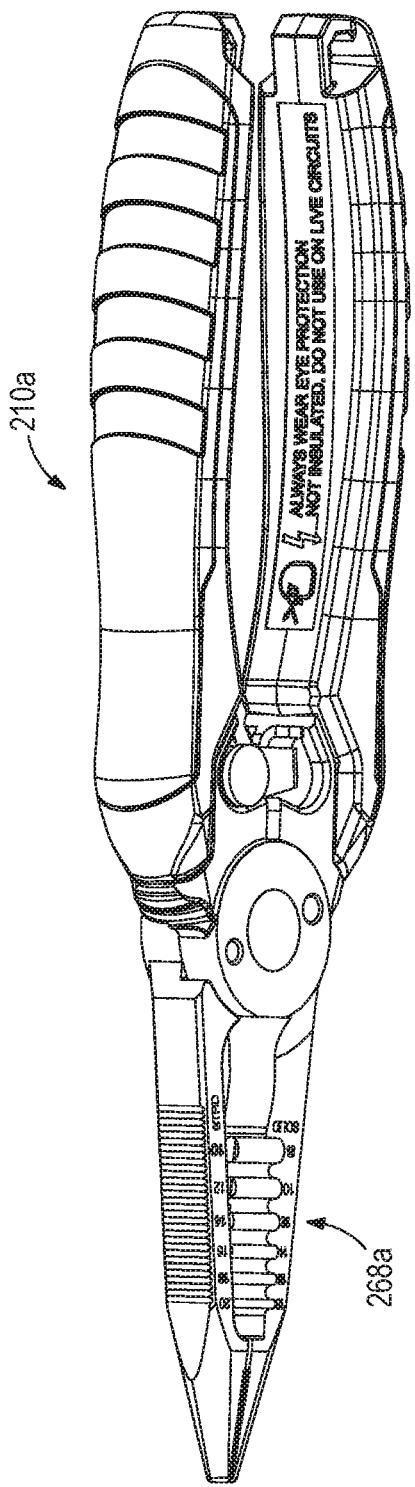

The illustrated pliers 10a include forged assemblies 12a, 14a, ribs 84a, a locking assembly 92a with a saddle locking member 104a and a ramp surface 100a, a tactile indicator 152a and a visual indicator 160a, as discussed above, and lanyard openings 144a. As shown in FIGS. 7 and 10, the pliers 10a includes a series of apertures 68a configured to strip standard wires of varying gauge size (e.g., 10-18 AWG (solid wire) and 12-20 AWG (stranded wire)). The illustrated pliers 10a do not include the elongated apertures 72 configured to strip Romex® wires.

The jaw portions 20a, 26a have an increased stiffness. In the illustrated construction of the pliers 10a, the jaw portions 20a, 26a have a length measured from the outer surface of the joint to the jaw end 16a of about 2.4". The jaw portions 20a, 26a have a width JWa of about 0.33".

Thus, the wire stripping portion can extend over a greater portion of the jaw length. For example, in the illustrated construction, the length SLa of the wire stripping portion is about 0.9" and the length JWa of jaw portions 20a, 26a is about 2.4". The wire stripper 10 may be constructed with a ratio of the length SLa of the wire stripping portion to the jaw length JLa in a range of 0.30 to 0.45 and, more specifically, in a range of about 0.35 to 0.38.

As described above, in the illustrated construction, each individual jaw portion 20a, 26a has a spring constant of about 2900 pounds per inch (lbs./in.) to about 3000 lbs./in. when a force is applied in a direction parallel to the pivot axis A to the tip of the jaw portion 20a, 26a with the pivot pin 34a being held. In other constructions, the spring constant of each jaw portion 20a, 26a may be above the thresholds and/or within the ranges described above.

In addition, the stripping apertures 68a, 72a can be positioned farther from the pivot axis A. For example, in the illustrated construction, the distance of the end of the stripper aperture 88a farthest from the outer surface of the joint is about 1.46". The distal NM stripper aperture 88a is positioned at about 60% of the length of the jaw portions 20a, 26a.

Again, as described below in more detail, while having an increased stiffness or spring constant, the pliers 10a are constructed such that the stripping apertures 68a, 72a are visible from above when the pliers 10a are tilted at a small angle from vertical (e.g., about 15° (close to a top view of the pliers 10a)), a relatively comfortable work position for the user.

As mentioned above and as shown in FIGS. 10f-10g, the pliers 10a includes a tactile indicator 152a to distinguish the pliers 10a from other pliers, wire strippers, tools, etc. The illustrated tactile indicator 152a is in the form of notches 168 defined by the over-mold 132a at the handle end 18a and extending to the lanyard opening 144a. As previously mentioned the wire stripper 10 does not include such notches 168 so that a user can quickly distinguish between the pliers 10a and the wire stripper 10 of FIGS. 1-6, as well as from other tools, by feeling for the notches 168 formed by the over-mold 132a.

As also mentioned above and as shown in FIG. 10g, the pliers 10a also include a visual indicator 160a (e.g., the characters "CP") located on the over-mold 132a at the handle end 18a. This allows the user to visually distinguish the pliers 10a from the wire strippers 10 or other tools, by simply looking at the handle end 18a.

FIGS. 13-25 illustrate an alternative construction of a hand tool, such as a wire stripper 210. The wire stripper 210 has a similar construction as the wire stripper 10, and common components have the same reference number plus 200.

As described above, in the illustrated construction, each individual jaw portion 220, 226 has a spring constant of about 2900 pounds per inch (lbs./in.) to about 3000 lbs./in. when a force is applied in a direction parallel to the pivot axis A to the tip of the jaw portion 220, 226 with the pivot pin 234 being held. In other constructions, the spring constant of each jaw portion 220, 226 may be above the thresholds and/or within the ranges described above.

As mentioned above, while having an increased stiffness or spring constant, the wire stripper 10 is constructed such that, as shown in FIGS. 18B-18K, the stripping apertures 68, 72 are visible from above when the wire stripper 10 is tilted a small angle from vertical (the minimum viewing angle), a relatively comfortable work position for the user. In contrast, other tools (not shown) with wire stripping portions require the tool to be held at an extreme angle (e.g., from about 60° up to about 90° from vertical (a side view of the tool)), resulting in a less comfortable work position for the user.

In the illustrated construction (see FIGS. 19-21), each jaw portion 220, 226 has a ridged gripping surface 380 in a plane parallel to pivot axis A and side walls 384 in a plane perpendicular to pivot axis A and to the gripping surface 380. An outer wall 388 connects the side walls 384.

Figure 32:
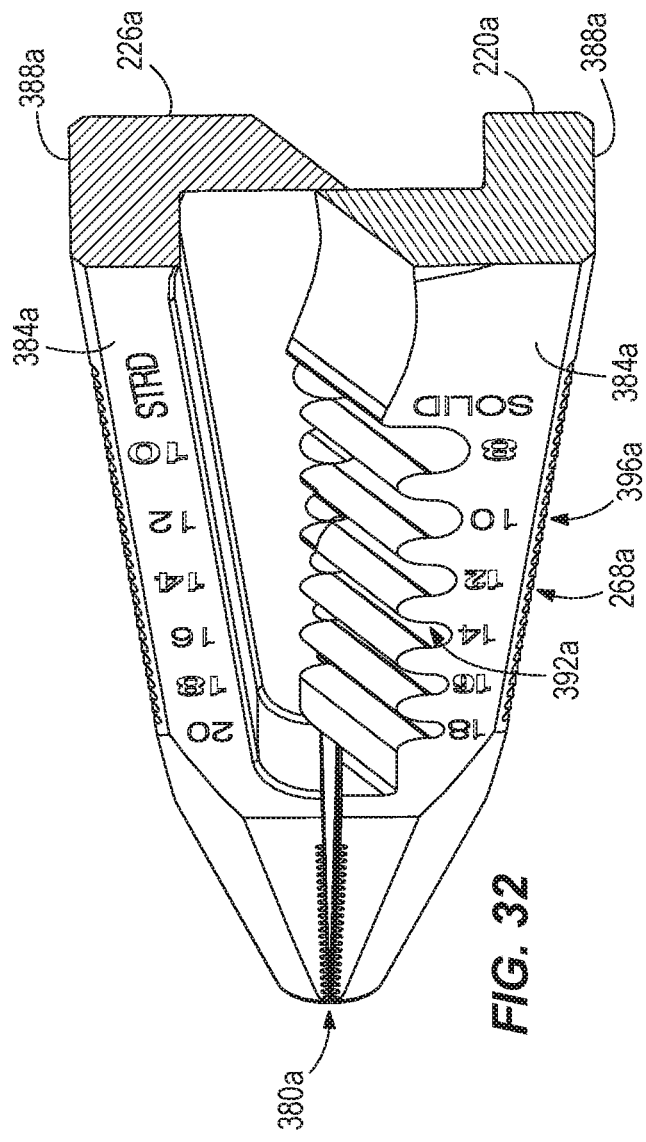
FIG. 32 is a perspective view of jaw portions of the pliers of FIG. 26.
Figure 33:
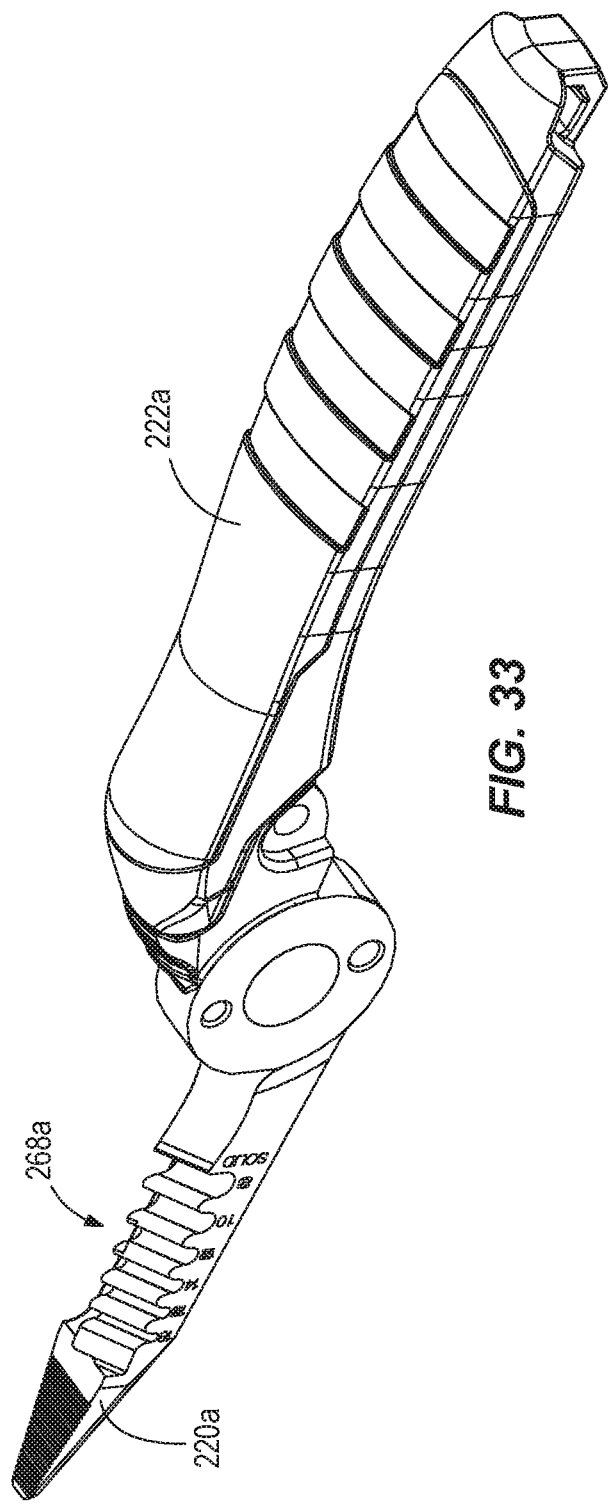
FIG. 33 is a perspective view of a jaw assembly of the pliers of FIG. 26.
Figure 34:
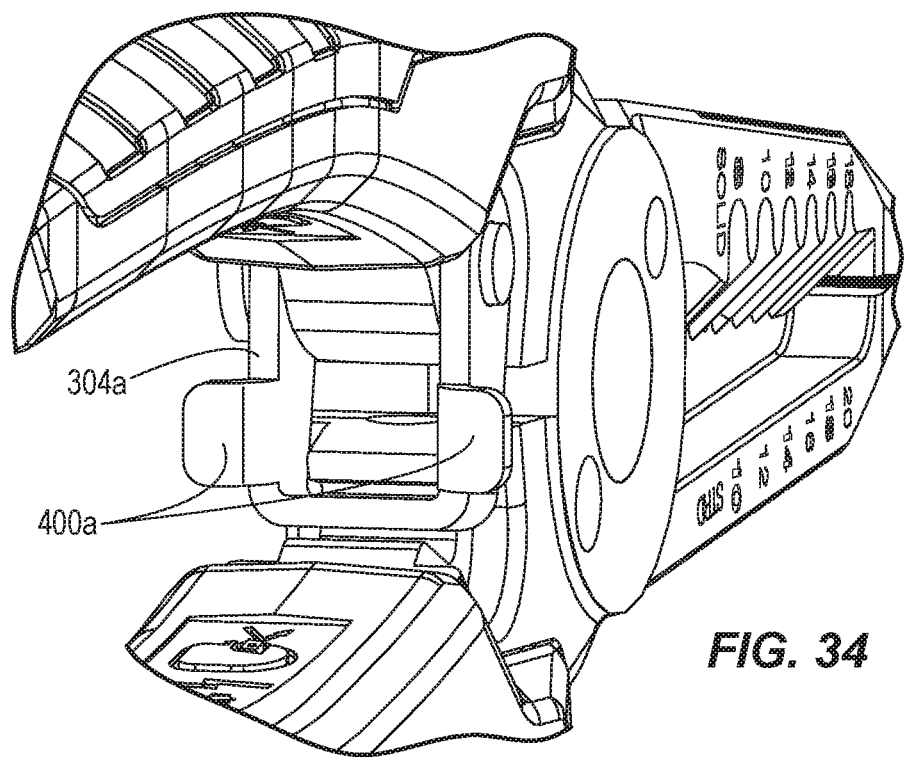
FIG. 34 is an enlarged rear perspective view of a locking assembly of the pliers of FIG. 26.
Figure 35:
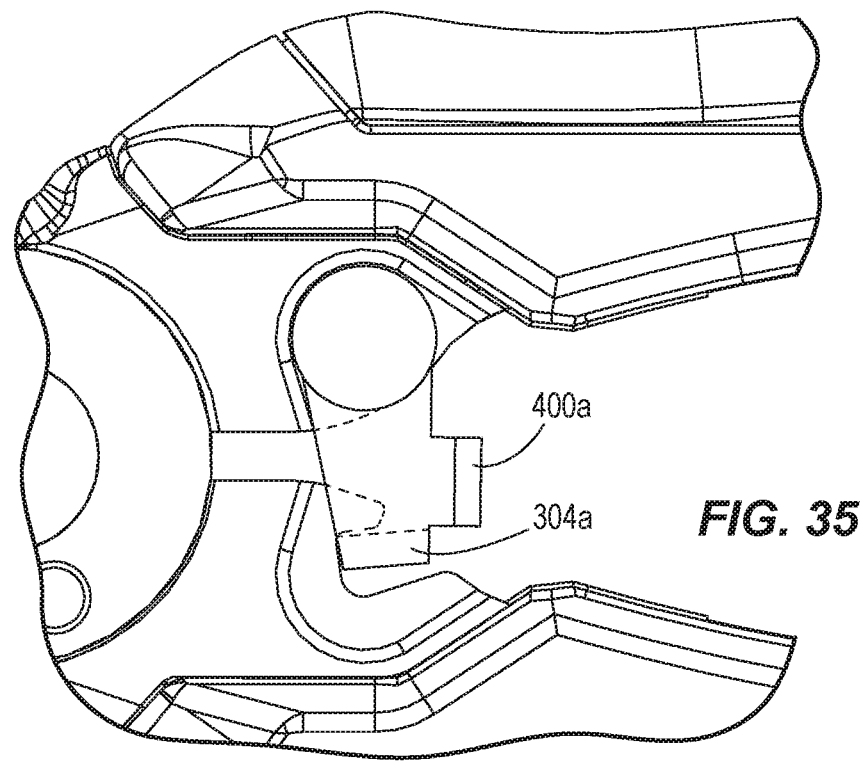
FIG. 35 is an enlarged side view of the locking assembly shown in FIG. 34, with the locking member illustrated as transparent.

Each jaw portion 220, 226 has an angled wall 392 defining the wire stripping portion and arranged at a non-parallel angle relative to the gripping surface 380 and non-perpendicular to the side wall 384. The stripping apertures 268, 272 extend along the angled wall 392 from the cutting edges to the side wall 384. With the angle, the outer end of each aperture 268, 272 is spaced from a plane of cutting edges toward the outer wall 388. An indicator 396 (see FIG. 32) of the appropriate wire to be stripped by an aperture 268, 272 is provided on the side wall 384 proximate the outer end of each aperture 268, 272.

Each side wall 384 is entirely substantially vertical (e.g., perpendicular to the outer wall 384 from the outer wall 384 all the way to the outer end of the wire stripping apertures 268, 272). Due to the angle of the wall 392 and the construction of the side wall 384, the end of each stripping aperture 268, 272 and/or the associated indicator 396 is more easily visible (e.g., at the minimum viewing angle).

As mentioned above, in the illustrated construction (see FIGS. 18B-18K), the minimum viewing angle is about 15° from vertical, close to a top view of the wire stripper 210. In some constructions, the minimum viewing angle may be less than about 45°, less than about 30° or less than about 20°. In some constructions, the minimum viewing angle may be between about 60° and about 10°. In some constructions, the minimum viewing angle may be between 25° and about 15°.

In the illustrated construction (see FIGS. 22-25), the locking member 304 is a U-shaped, saddle locking member. One or more cam members 400 are provided on a rear end of the locking member 304 and are engageable with the handle portion 222 when the locking member 304 is moved the open position. The cam members 400 limit movement of the locking member 304 in the direction of the open position. The cam members 400 are shaped and constructed to provide resilience. The cam members 400 can thus absorb a force applied to the locking member 304 to inhibit damage to the locking member 304 and/or to other components of the wire stripper 210.

FIGS. 26-35 illustrate an alternative construction of a hand tool, such as pliers 210a. The pliers 210a have a similar construction as the pliers 10a, and common components have the same reference number plus 200.

As described above, in the illustrated construction, each individual jaw portion 220a, 226a has a spring constant of about 2900 pounds per inch (lbs./in.) to about 3000 lbs./in. when a force is applied in a direction parallel to the pivot axis A to the tip of the jaw portion 220a, 226a with the pivot pin 234a being held. In other constructions, the spring constant of each jaw portion 220a, 226a may be above the thresholds and/or within the ranges described above.

As described above, while having an increased stiffness or spring constant, the pliers 210a are constructed such that, as shown in FIGS. 31B-31G, the stripping apertures 268a, 272a are visible from above when the pliers 210a are tilted at a small angle from vertical (e.g., about 15° (close to a top view of the pliers 210a)), a relatively comfortable work position for the user.

As described above, in the illustrated construction (see FIGS. 34-35), the locking member 304a includes one or more cam members 400a to limit movement of the locking member 304a in the open direction.

Thus, the invention may generally provide, among other things, a hand tool, such as a wire stripper, pliers, etc., with a ramp to cause a locking member to pivot away from the locking position as the jaw portions are closed. The hand tool may also include raised ribs on the lateral surface of the jaws from reaming. The hand tool may include a handle having a T-shaped cross-section. The hand tool may also include a tactile indicator on the end of the handle to distinguish from other tools. The hand tool may include a lanyard opening being defined through a portion of a handle within the periphery of the handle. A forged wire stripper may include jaws defining a stripping aperture for Romex® NM wire. Each individual jaw of the hand tool may have increased stiffness. The hand tool may have stripping apertures visible from above when tool is tilted a small angle from vertical (the minimum viewing angle), a relatively comfortable work position for the user. The locking member of the hand tool may include a cam engageable with a handle to limit movement of the locking member in the direction of the open position.

Although the invention has been described in detail with reference to certain preferred embodiments, variations and modifications exist within the scope and spirit of one or more independent aspects of the invention as described. It should be understood that structure of one of the wire strippers 10, 210 or pliers 10a, 210a not included in another of the wire strippers 10, 210 or pliers 10a, 210a may be incorporated into the other(s) of the wire strippers 10, 210 or pliers 10a, 210a and vice versa.

One or more independent features and independent advantages may be set forth in the claims.

What is claimed is:

1. A hand tool comprising:
a first jaw assembly including a first handle portion, a first jaw portion, and a first pivot portion, the first jaw portion having a first jaw tip;
a second jaw assembly including a second handle portion, a second jaw portion, and a second pivot portion, the second jaw portion having a second jaw tip; and
a pivot pin coupling the first pivot portion and the second pivot portion for pivoting movement of the first jaw assembly and the second jaw assembly about a pivot axis between an open position and a closed position, a longitudinal plane extending perpendicular to the pivot axis;
wherein each of the first jaw portion and the second jaw portion has a spring constant more than about 2,225 lbs./in., measured when a force is applied in a direction parallel to the pivot axis to an associated jaw tip with the pivot pin being held;
wherein the first jaw portion has a first gripping surface extending in a gripping plane parallel to the pivot axis, first side walls perpendicular to the gripping plane, and a first outer wall connecting the first side walls, the first jaw portion having a first angled wall connected to one of the first side walls and defining a first wire stripping portion, the first wire stripping portion including a first cutting edge and a first recess defined in the first angled wall, the first recess extending from the first cutting edge to an end at the one of the first side walls, the first angled wall being arranged non-parallel to the gripping surface and non-perpendicular to the one of the first side walls, the first cutting edge being proximate the longitudinal plane and spaced from the other of the first side walls, the first jaw portion including a first wall portion extending from the first cutting edge to the other of the first side walls, the first wire stripping portion being on one side of the longitudinal plane and the first wall portion being on an opposite side of the longitudinal plane;
wherein the second jaw portion has a second gripping surface extending parallel to the gripping plane, second side walls perpendicular to the gripping plane, and a second outer wall connecting the second side walls, the second jaw portion having a second angled wall connected to one of the second side walls and defining a second wire stripping portion, the second wire stripping portion including a second cutting edge and a second recess defined in the second angled wall, the second recess extending from the second cutting edge to an end at the one of the second side walls, the second angled wall being arranged non-parallel to the second gripping surface and non-perpendicular to the one of the second side walls, the second cutting edge being proximate the longitudinal plane and spaced from the other of the second side walls, the second jaw portion including a second wall portion extending from the second cutting edge to the other of the second side walls, the second wire stripping portion being on the opposite side of the longitudinal plane and the second wall portion being on the one side of the longitudinal plane.

2. The hand tool of claim 1, wherein each of the first jaw portion and the second jaw portion has a spring constant of up to about 3,200 lbs./in.

3. The hand tool of claim 2, wherein each of the first jaw portion and the second jaw portion has a spring constant of between about 2,900 lbs./in. and about 3,000 lbs./in.

4. A hand tool comprising:

a first jaw assembly including a first handle portion, a first jaw portion, and a first pivot portion;

a second jaw assembly including a second handle portion, a second jaw portion, and a second pivot portion; and a pivot pin coupling the first pivot portion and the second pivot portion for pivoting movement of the first jaw assembly and the second jaw assembly about a pivot axis between an open position and a closed position, a longitudinal plane extending perpendicular to the pivot axis;

wherein the first jaw portion has a first gripping surface extending in a gripping plane parallel to the pivot axis, first side walls perpendicular to the gripping plane, and a first outer wall connecting the first side walls, the first jaw portion having a first angled wall connected to one of the first side walls and defining a first wire stripping portion, the first wire stripping portion including a first cutting edge and a first recess defined in the first angled wall, the first recess extending from the first cutting edge to an end at the one of the first side walls, the first angled wall being arranged non-parallel to the gripping surface and non-perpendicular to the one of the first side walls, the first cutting edge being proximate the longitudinal plane and spaced from the other of the first side walls, the first jaw portion including a first wall portion extending from the first cutting edge to the other of the first side walls, the first wire stripping portion being on one side of the longitudinal plane and the first wall portion being on an opposite side of the longitudinal plane; and wherein the second jaw portion has a second gripping surface extending parallel to the gripping plane, second side walls perpendicular to the gripping plane, and a second outer wall connecting the second side walls, the second jaw portion having a second angled wall connected to one of the second side walls and defining a second wire stripping portion, the second wire stripping portion including a second cutting edge and a second recess defined in the second angled wall, the second recess extending from the second cutting edge to an end at the one of the second side walls, the second angled wall being arranged non-parallel to the second gripping surface and non-perpendicular to the one of the second side walls, the second cutting edge being proximate the longitudinal plane and spaced from the other of the second side walls, the second jaw portion including a second wall portion extending from the second cutting edge to the other of the second side walls, the second wire stripping portion being on the opposite side of the longitudinal plane and the second wall portion being on the one side of the longitudinal plane;

wherein the first jaw portion and the second jaw portion define a jaw length, wherein the first wire stripping portion defines a first wire stripping portion length, wherein a ratio of the first wire stripping portion length to the jaw length is in a range of 0.4 to 0.55.

5. The hand tool of claim 4, wherein the first wire stripping portion further includes another first recess defined in the first angled wall and extending from the first cutting edge to a another end at the one of the first side walls, the other first recess being spaced along the first jaw portion from the first recess.

6. The hand tool of claim 5, further comprising, on the one of the side walls, a first indicator proximate the end of the first recess and a second indicator proximate the end of the other first recess.

7. The hand tool of claim 4, wherein the second wall portion defines an open area opposite the first angled wall, and wherein the first wall portion defines an open area opposite the second angled wall.

8. The hand tool of claim 4, wherein the first jaw portion has a first jaw tip and the second jaw portion has a second jaw tip, and wherein each of the first jaw portion and the second jaw portion has a spring constant more than about 2,225 lbs./in., measured when a force is applied in a direction parallel to the pivot axis to an associated jaw tip with the pivot pin being held.

9. The hand tool of claim 8, wherein each of the first jaw portion and the second jaw portion has a spring constant of up to about 3,200 lbs./in.

10. The hand tool of claim 9, wherein each of the first jaw portion and the second jaw portion has a spring constant of between about 2,900 lbs./in. and about 3,000 lbs./in.

* * * * *